US007685207B1

(12) United States Patent
Helms

(10) Patent No.: US 7,685,207 B1
(45) Date of Patent: Mar. 23, 2010

(54) ADAPTIVE WEB-BASED ASSET CONTROL SYSTEM

(75) Inventor: William Helms, Washington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 568 days.

(21) Appl. No.: 10/627,144

(22) Filed: Jul. 25, 2003

(51) Int. Cl.
*G06F 17/30* (2006.01)
(52) U.S. Cl. ...................................... 707/790
(58) Field of Classification Search ............... 707/104.1, 707/3, 10, 8, 1, 100
See application file for complete search history.

(56) References Cited

U.S. PATENT DOCUMENTS

| | | | | |
|---|---|---|---|---|
| 5,224,034 | A | 6/1993 | Katz et al. ................. | 364/401 |
| 5,970,465 | A | 10/1999 | Dietrich et al. ............... | 705/7 |
| 5,970,475 | A * | 10/1999 | Barnes et al. ................. | 705/27 |
| 6,029,174 | A | 2/2000 | Sprenger et al. ............ | 707/103 |
| 6,148,291 | A * | 11/2000 | Radican ....................... | 705/28 |
| 6,157,928 | A | 12/2000 | Sprenger et al. ............ | 707/103 |
| 6,330,542 | B1 | 12/2001 | Sevcik et al. .................. | 705/8 |
| 6,341,261 | B1 | 1/2002 | Vasey-Glandon et al. ...... | 703/6 |
| 6,363,388 | B1 * | 3/2002 | Sprenger et al. ............. | 707/10 |
| 6,587,838 | B1 * | 7/2003 | Esposito et al. .............. | 705/26 |
| 6,650,346 | B1 * | 11/2003 | Jaeger et al. ................ | 715/764 |
| 6,725,222 | B1 * | 4/2004 | Musgrove et al. ............. | 707/10 |
| 6,768,994 | B1 * | 7/2004 | Howard et al. ............... | 707/10 |
| 6,806,813 | B1 * | 10/2004 | Cheng et al. ........... | 340/825.49 |
| 6,901,377 | B1 * | 5/2005 | Rosenfeld et al. .............. | 705/26 |
| 6,990,482 | B1 * | 1/2006 | Piotrowski et al. ............. | 707/3 |
| 7,330,856 | B2 * | 2/2008 | Nicastro et al. ......... | 707/103 R |
| 7,353,232 | B1 * | 4/2008 | Kalucha et al. .............. | 707/100 |
| 2001/0037333 | A1 * | 11/2001 | Nishimura ...................... | 707/9 |
| 2002/0065825 | A1 * | 5/2002 | Kassan et al. .................. | 707/9 |
| 2002/0073114 | A1 * | 6/2002 | Nicastro et al. ............. | 707/500 |
| 2002/0091699 | A1 * | 7/2002 | Norton et al. .................. | 707/10 |
| 2003/0009455 | A1 * | 1/2003 | Carlson et al. ................. | 707/6 |
| 2003/0041063 | A1 * | 2/2003 | Brady ......................... | 707/10 |
| 2003/0084067 | A1 * | 5/2003 | Obiaya .................... | 707/104.1 |
| 2005/0028104 | A1 * | 2/2005 | Apparao et al. ............. | 715/738 |
| 2005/0076034 | A1 * | 4/2005 | Addonisio et al. ............ | 707/10 |

* cited by examiner

*Primary Examiner*—Hosain T Alam
*Assistant Examiner*—Leon Harper
(74) *Attorney, Agent, or Firm*—Christopher A. Monsey

(57) ABSTRACT

Disclosed herein is an adaptive Internet-based product control system that utilizes web technology to gather and present asset control data in an environment with constantly changing requirements due to various third party demands and/or funding restrictions. The present system tracks third party assets, provides real-time data regarding current status, and assists in returning the assets to the customer in a more timely fashion. The system can adapt to constantly changing user requirements by use of a Cold Fusion database interface to a set of data files that can be constructed and reconstructed on-the-fly. Multiple third party structures are supported with one central data file that handles the security logs and one central tasking data bank for tracking specific third party funding/tasking. The system also interfaces with bar code readers to gather of asset data and to upload it at a later time.

4 Claims, 46 Drawing Sheets

805 Production Control System, *Rev 3.1*

Log In Screen For Production Control System

Log In (User ID): ⬜ —12

Password ⬜ —13

—14

New User —15

Send Comments To Webmaster
16

Home | PCS | Tech | Reports | Tasks | Options | DB Sel | Logistics | Admin

805 Production Control System, *Rev 3.1*
Database In Use:

PCS Change Proposal Request Form

Change Proposal Against:    99    Section: Help Document ▽ — 86

Describe request:    87

Date:    02/28/2003    — 88

Requested By:    — 89

FIG. 2B

| Home | PC | Tech | Reports | Tasks | Options | DB Sel | Logistics | Admin |

805 Production Control System, Rev 3.1
Database In Use:

Entry Form For New Job (Serial Number)

Today's Date: 09/07/2002 — 222

Select either NSN: All  505 — 227  or Equipment: All  501 — 226

Task Request Number  503

Purpose Code  230  S  504

Requested Task  224  Acceptance — 506

Serial Number  507

Select either Owner: ?????  509  or UIC: ?????  508 — 515

Transfer Date In  09/07/2002 — 510

ICN  511

Schedule Control Number  512

Incoming Document Number  513

Comments  514

FIG. 4

805 Shop Traveler - Printed by         for
Please use charge number: 385E096      *This task is Urgent*

| | |
|---|---|
| Requested Task: | Repair |
| Task is for: | Canada |
| Located at (UIC): | CCCCC |
| Assigned Job Number: | 3221 |
| Equipment: | Canadian LTM-91 |
| NSN: | N/A |
| Serial Number: | 011 |
| Date received on dock: | 02/14/2003 |
| Traveler Date: | 02/27/2003 |
| Task Request Number: | 2394 |
| Schedule Number: | |
| Original Purpose Code: | J |
| ICN: | NOSR |
| Incoming Document: | NONE |
| Comments: | |

Return to: VALCOM Limited, 175 Southgate Drive, Guelph, Ontario, Canada N1G 3M5

This block is for recording technician data when not using Production Control System for data    104

If acceptance: Pass____ Fail____      Total Hours worked:_____
Date of Acceptance or Repair:_____      Final Status Code:_____
Describe any failures:
_____
_____

Describe any repairs:
_____
_____

List any parts used:
_____
_____

Technician comments:
_____
_____

Procedure Number:
_____

FIG. 6

[Home] [PC] [Tech] [Reports] [Tasks] [Options] [DB Sel] [Logistics] [Admin]

**805 Production Control System, *Rev 3.1***
Database In Use:

Edit Ongoing Repair Job For AN/PVS-15 With Serial Number 02075

Assigned Job number: 3723                    Accepted by: Helms, Bill

Job start Date: [08/23/2002] _541_           Job completion Date: [08/26/2002] _547_

Job Status                                   Job Description
_542_ [M_to_L] — _537_                       [Move Item to L condition code] _548_

Select Failure Description                   Select Repair Description
[Beyond economical repair]                   [Align Optics
 Boresight Alignment _553_                    Cleaned _549_
 Consumable]                                  N/A]

Failures for this job                        Repairs for this job
[Tube failure                                [Repairs:
 _544_]                                       _555_]

Total labor: [0.5] _545_  +0.5  +0.1  +1.0  −1.0  −0.1

Repair Comments
                                             [Right tube bad goes dim in
                                              subdued lighting _551_]

Parts Used
                                             [ _552_ ]

Repair (Parts) Total: [_546_ $ 0.00]

805 Producti n Control System, *Rev 3.1*
Database In Use:

Image Intensifier Test Data Sheet

NSN: 5855-01-151-4191    Serial Number:    56497BB    Job Number:    1802
AIMS File Name: [ 561 ]    AIMS MTF @ 36 lp/mm: [ 562 ]

Photometric Tests

|  | Actual | Minimum | Maximum |
|---|---|---|---|
| R1 = [ 563 ]   EBI = [ 564 ] x10-11 |  |  | 3.0 x 10⁻¹¹ |
| Maximum Gain (R3) | [ 565 ] K | 20 K | 35 K |
| Minimum Gain | [ 566 ] K | 3.5 K | 10.5 K |
| Input current | [ 567 ] ma |  | 45 ma |
| Signal to Noise Ratio | [ 568 ] :1 | 16.2 :1 |  |
| Center Resolution | [ 569 ] lp/mm | 36 lp/mm |  |

Visual Quality

| Spot Size | Zone 1 | Zone 2 | Zone 3 |
|---|---|---|---|
| .015 in. or greater | [ 570 ] (0) | [ 576 ] (0) | [ 582 ] (0) |
| .012 - .015 in | [ 571 ] (0) | [ 577 ] (1) | [ 583 ] (2) |
| .009 - .012 | [ 572 ] (0) | [ 578 ] (3) | [ 584 ] (3) |
| .006 - .009 | [ 573 ] (1) | [ 579 ] (6) | [ 585 ] (9) |
| .003 - .006 | [ 574 ] (3) | [ 580 ] (10) | [ 586 ] (14) |
| Bright Spots | [ 575 ] (0) | [ 581 ] (0) | [ 587 ] (0) |

Notes:

Reason For Failure

| ☐ Dead | ☐ Shear Distortion | ☐ Chicken Wire | ☐ Shorted |
| ☐ Shaded | ☐ Oversized Spots | ☐ EMI Failure | ☐ Flickers |
| ☐ Edge Glow | ☐ Honey Comb | ☐ 30% Contrast | ☐ Arcing |
| ☐ Bright Spot | ☐ Gross Distortion | ☐ Housing Damage | ☐ Resolution |
| ☐ Emission Point | ☐ Excessive Spots | ☐ Distraction Defect | ☐ Gain |
| ☐ EBI | ☐ Input Current | ☐ Signal to Noise | ☐ Halo |

588    589    592

QA Result: [ Pass ✓ ]    Date: [09/07/2002]    Technician: Helms, Bill
Labor hours: [0.7]  +0.5  +0.1  +1.0  -1.0  -0.1
Comments:    590

[ 591 ] 

FIG. 8

  Home | PC | Tech | Reports | Tasks | Options | DB Sel | Logistics | Admin

805 Production Control System, *Rev 3.1*
Database In Use:

Image Intensifier Test Data Sheet

NSN: 5855-01-151-4191  Serial Number: SMD00186  Job Number: 120

AIMS File Name:  AIMS MTF @ 36 lp/mm:

Photometric Tests

| | Actual | Minimum | Maximum |
|---|---|---|---|
| $R1 =$ 1.78-4   $EBI =$ 3.2 x10-11 | | | $3.0 \times 10^{-11}$ |
| Maximum Gain (R3) | 48.7 K | 20 K | 35 K |
| Minimum Gain | 6.1 K | 3.5 K | 10.5 K |
| Input current | 26.1 ma | | 45 ma |
| Signal to Noise Ratio | 27 :1 | 16.2 :1 | |
| Center Resolution | 45 lp/mm | 36 lp/mm | |

Visual Quality

| Spot Size | Zone 1 | Zone 2 | Zone 3 |
|---|---|---|---|
| .015 in. or greater | (0) | (0) | (0) |
| .012 - .015 in | (0) | (1) | (2) |
| .009 - .012 | (0) | (3) | (3) |
| .006 - .009 | (1) | (6) | (9) |
| .003 - .006 | (3) | (10) | (14) |
| Bright Spots | (0) | (0) | (0) |

Notes:

Reason For Failure:

| | | | |
|---|---|---|---|
| Dead | Shear Distortion | Chicken Wire | Shorted |
| Shaded | Oversized Spots | EMI Failure | Flickers |
| Edge Glow | Honey Comb | 30% Contrast | Arcing |
| Bright Spot | Gross Distortion | Housing Damage | Resolution |
| Emission Point | Excessive Spots | Distraction Defect | Gain |
| X EBI | Input Current | Signal to Noise | Halo |

QA Result: M_to_H  Date: 06/24/2002  Technician: Cundiff, John
Labor hours: 1.00
Comments:

FIG. 9

805 Production Control System, Rev 3.1
Database In Use: 79

Items That Are In G Condition 160

18 Records Found In The NSW Database 161

| Job Number | ICN | Equipment | Serial Number | Repairer | Job Status | Date Transfer In | Day(s) in Shop |
|---|---|---|---|---|---|---|---|
| 3700 | NOSR | AN/PVS-21 | 0955 | | M_to_G | 19-Aug-02 | 19 |
| 3699 | NOSR | AN/PVS-21 | 0953 | | M_to_G | 19-Aug-02 | 19 |
| 3701 | NOSR | AN/PVS-21 | 0956 | | M_to_G | 19-Aug-02 | 19 |
| 3702 | NOSR | AN/PVS-21 | 0957 | | M_to_G | 19-Aug-02 | 19 |
| 3703 | NOSR | AN/PVS-21 | 0959 | | M_to_G | 19-Aug-02 | 19 |
| 3704 | NOSR | AN/PVS-21 | 0960 | | M_to_G | 19-Aug-02 | 19 |
| 3705 | NOSR | AN/PVS-21 | 0961 | | M_to_G | 19-Aug-02 | 19 |
| 3706 | NOSR | AN/PVS-21 | 1002 | | M_to_G | 19-Aug-02 | 19 |
| 3707 | NOSR | AN/PVS-21 | 1005 | | M_to_G | 19-Aug-02 | 19 |
| 3710 | NOSR | AN/PVS-21 | 1008 | | M_to_G | 19-Aug-02 | 19 |
| 3711 | NOSR | AN/PVS-21 | 1009 | | M_to_G | 19-Aug-02 | 19 |
| 3712 | NOSR | AN/PVS-21 | 1010 | | M_to_G | 19-Aug-02 | 19 |
| 3714 | NOSR | AN/PVS-21 | 1012 | | M_to_G | 19-Aug-02 | 19 |
| 3715 | NOSR | AN/PVS-21 | 1013 | | M_to_G | 19-Aug-02 | 19 |
| 3716 | NOSR | AN/PVS-21 | 1014 | | M_to_G | 19-Aug-02 | 19 |
| 3717 | NOSR | AN/PVS-21 | 1015 | | M_to_G | 19-Aug-02 | 19 |
| 3718 | NOSR | AN/PVS-21 | 1016 | | M_to_G | 19-Aug-02 | 19 |
| 3722 | NOSR | AN/PVS-21 | 1004 | | M_to_G | 23-Aug-02 | 15 |
| 162 | 163 | 164 | 165 | 166 | 167 | 168 | 169 |

FIG. 14

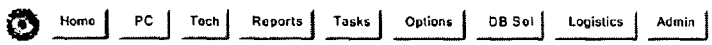

805 Production Control System, *Rev 3.1*
Database In Use: 79

Report - Parts For     Sorted By Equipment 190

Parts For: AN/AVS-6   191

| | *Part Number | Common Name | NSN | Cost | On hand | Available to Tech | Location | Ref No. |
|---|---|---|---|---|---|---|---|---|
| Edit | 1-1/2SC | EYEPIECE LENS CAP (15MM) | 5340-01-058-5930 | $0.00 | 0 | Visble | | NA |
| Edit | 268465 | POWER PACK ASSY, LOW PROFILE | 5855-01-440-1765 | $114.00 | 0 | Visble | | NA |
| Edit | 300680-G3 | POWER PACK | 5855-01-149-4104 | $153.00 | 0 | Visble | | NA |
| Edit | 5002530 | HELMET MOUNT (V1) | 5855-01-151-4229 | $178.00 | 0 | Visble | | NA |
| Edit | 5002550 | OBJECTIVE LENS ASSY | 5855-01-149-4101 | $232.00 | 0 | Visble | | NA |
| Edit | 5002567 | SLOTTED ADAPTER | 5855-01-211-2437 | $5.00 | 0 | Visble | | NA |
| Edit | 5002569 | TUBE RETAINER RING | 5855-01-151-4226 | $3.00 | 0 | Visble | | NA |
| Edit | 5002583 | OBJECTIVE LOCK RING | 5365-01-149-4102 | $4.00 | 0 | Visble | | NA |
| Edit | 5002601 | NECK CORD ASSY | 4020-01-023-6271 | $1.00 | -5 | Visble | | NA |
| Edit | 5002760 | IMAGE TUBE | 5855-01-151-4191 | $1,965.00 | 0 | Visble | | NA |
| Edit | 5006831 | OBJECTIVE LENS CAP | 5855-01-152-5849 | $0.00 | 0 | Visble | | NA |
| Edit | 5008902 | AA BATTERY CARTRIDGE | 6160-01-372-5994 | $2.00 | -3 | Visble | | NA |
| Edit | 5009493 | OBJECTIVE LENS CAP (W/LIF) | 5340-00-558-4692 | $0.00 | 0 | Visble | | NA |
| Edit | 5009545 | EYEPIECE LENS ASSY | 5855-01-380-5102 | $345.00 | 0 | Visble | | NA |
| Edit | 5009555 | V1 PIVOT ADJUSTMENT SHELF | 5855-01-381-6036 | $240.00 | 0 | Visble | | NA |
| Edit | EC-23 | PURGE O-RING | 5330-01-066-1920 | $0.00 | 0 | Visble | | NA |
| Edit | EC-23 | OBJECTIVE LENS PROTECTIVE CAP | 5340-00-558-4692 | $0.00 | 0 | Visble | | NA |
| Edit | MS9021-021 | PREFORMED PACKING | 5330-00-822-3691 | $0.00 | 0 | Visble | | NA |
| Edit | MS9021-028 | PREFORMED PACKING | 5330-00-551-8251 | $0.00 | 0 | Visble | | NA |
| 192 | 193 | 194 | 195 | 196 | 197 | 198 | 199 | 200 |

FIG. 16A

| Home | PC | Tech | Reports | Tasks | Options | DBSel | Logistics | eAdmin |

805 Production Control System, *Rev 3.1*
Database In Use: 79

Edit Record

Equipment: AN/PEQ-1A — 370

*Part Number: [39100003] — 371

Part Name: [BUSHING, PURGE] — 372, 373

Part NSN: [6515-00-288-1911] — 373

Part Cost: [$ 61.02] — 374

Inventory count: [14] — 375

Inventory Trip Point: [0] — 376

COG: [ ] — 377

Ref no: [ ] — 378

Display Part on Tech Screen?  No ○  Yes ● — 379

Location Code: [ ] — 380

*Part Number is used for inventory counting. They are required and must be unique.

[Delete Part] — 381

FIG. 16B

805 Production Control System, *Rev 3.1*

Database In Use: 79

Task Request

- New Task Request 210
- Edit Task Request Information 211

Task Request Reports

- Task Request Information 212
- Job Status Information 213

Request For Issue

- Request For Issue 214
- Request For Issue Viewer 215
- Request For Issue List 216

FIG. 17

| Home | PC | Tech | Reports | Tasks | Options | DB Sel | Logistics | Admin |

805 Production Control System, *Rev 3.1*
Database In Use: <u>79</u>

Task Request Page

Step 1: Requester Information

From:  Code: 221  Date: 222
Helms, Bill  220    805  621    09/07/2002

Step 2: Tasking Requested

Urgent, Please Service  223

Select desired task:  Acceptance  506
                                   224

Description:
   225

FIG. 18A

Step 3: Equipment Information

Step 3a: Enter in equipment stock number(s) or name(s)

| Equipment | NSN |
|---|---|
| All  226 | All  227 |
| AN/AVS-6 | 5855-01-138-4749 |
| AN/AVS-6(V)1B | 5855-01-439-1744 |
| AN/AVS-9(V)G | 5855-01-433-3157 |
| AN/AVS-9(V)R | 5855-01-473-2904 |

```
This task request is for

228
```

Step 3b: Enter in condition code of item(s) (present status of item)

628 [A] Issue without qualifications  229  — 629

Step 3c: Enter in purpose code of item(s)

504 [A] NICP  230  —630

Step 3d: Enter quantity of item to be work: 1  231

Step 3e: Provide additional comments and desired results for this item(s)

```
Deliverables desired at completion of work:

Step 4: Financial Information

Please fill either WBS or Charge Number

| | WBS#: | Charge#: |
|---|---|---|
| Production Controller Labor: | 233 | 234 |
| Technician Labor: | 235 | 236 |
| Material: | 237 | 238 |
| Supply Support: | 239 | 240 |

Step 5: Information related to New Assets

| Contract Number: | Requisition #: |
|---|---|
| 241 | 242 |
| Contract CLIN#: | Quantity Ordered: |
| 243 | 244 |
| What project or group is material being ordered for? | From which company? |
| 245 | 246 |

Step 6: EMAIL Information

Forward To:
247 

From:
248

FIG. 18C

Task Request Is For 250

Step 1: Requester Information

Requested by: 251

From Code: 805 252

Date of request: 08/13/2002 253

Step 2: Tasking Requested

This item is urgent 254

Action requested for this item is Acceptance 255

Description:Warranty return,SN001665A. Unit has not been posted to records as of 13AUG02 but will be posted to D-condition, E-purpose 256

Step 3: Equipment Information

Supply condition code for this item is D 257

Purpose code for this item is E 258

This request is for 1 items 259

This request is for AN/PVS-17A(5855-01-474-8904) 260

Deliverables desired at completion of work: Return acceptable units A-condition and rejects units L-condition. 261

Step 4: Financial Information

Money for the Production Controller is via WBS or Charge number: 248FZ22 262

Money for the Technician is via WBS or Charge number: 248FZ22 263

Money for Material Support is via WBS or Charge number: 248FZ22 264

Money for Supply support is via WBS or Charge number: 248FZ22 265

Step 5: Information related to New Assets 266

The Contract Number for this task is N001264-98-D-0042, CLIN 0005

The Requisition Number for this task was not entered. 267

The Contract or Requisition quantity was not entered. 268

New items are being bought for SOPMOD from LITTON 270

Task Request Number Assigned: 1747 For 271- ⟍ 269

FIG. 19

Task Request Number Lookup

280  281          283
[ << ] [ < ] [ > ] [ >> ]
                 282

[ Select ]  284

| | |
|---|---|
| Task Request number: | 965 |
| Requester: | |
| Request date: | 08/30/2001 |
| Urgent Task?: | |
| Requested Task: | Testing |
| Description: | Description: Warranty repair Vipers coming in from Ashbury International need to be tested to confirm that the unit is now "A" condition. The PC will be notified if a unit is a warranty repair. |
| Equipment: | VIPER LASER RANG(5855-LL-L99-7478) |
| Supply Code: | L |
| Purpose Code: | S |
| Quantity: | 25 |
| Desc: | VIPER LASER RANG(5855-LL-L99-7478) |
| Contract Num: | |
| CLIN: | |

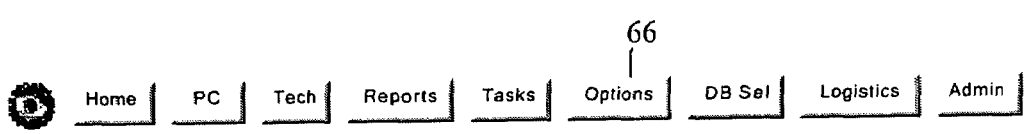

**805 Production Control System, *Rev 3.1***

Database In Use: 79

Maintenance Menu

Local To The Database Selected

- Equipment Edit/Add/Delete Page  310
- Activity Edit/Add/Delete Page  311
- Failure Code Edit/Add/ Page  312
- Repair Code Edit/Add/ Page  313
- Parts Edit/Add/ Page  314

Global To All Databases (Advise Caution When Making Changes)

- Status Codes Edit/Add/Delete Page  315
- Request Task Edit/Add/ Page  316
- Condition Code Edit/Add/ Page  317
- Purpose Code Edit/Add/ Page  318
- Help Information Edit/Add/ Page  319
- I2 Tube Datasheets Edit/Add/ Page  320

FIG. 22

| Home | PC | Tech | Reports | Tasks | Options | DB Sel | Logistics | Admin |

805 Production Control System, *Rev 3.1*
Database In Use: 79

Repair Codes Descriptions For Drop Down List Boxes  324

| | Repair Code | *Description | |
|---|---|---|---|
| | | | Add  325 |
| Edit | 108 | Align Optics | Delete |
| Edit | 105 | Cleaned | Delete |
| Edit | 999 | N/A | Delete |
| Edit | 106 | Nitrogen Purged Device | Delete |
| Edit | 109 | No repair needed | Delete |
| Edit | 110 | Non-Repairable | Delete |
| Edit | 102 | Repaired | Delete |
| Edit | 104 | Replace missing parts | Delete |
| Edit | 103 | Replaced | Delete |
| Edit | 107 | Set Infinity Focus | Delete |
| 326 | 327 | 328 | 329 |

FIG. 23

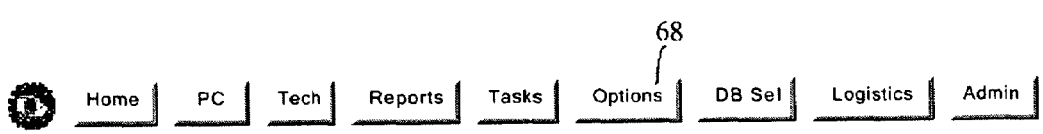

805 Production Control System, Rev 3.1
Database In Use: 79

Warranty/QDR Menu

Warranty Programs

- Add New Warranty Data    340

- Edit Warranty Data    341

Warranty Reports

- Report - Warranty Data - Sorted By Equipment    342

- Report - Warranty Data - Sorted By Contract Number    343

- Report - Warranty Data - Sorted By DD250    344

- Report - Warranty Data - Sorted By Requisiton Number    345

QDR Programs

- QDR Form    346

- Code 11 (Supply) DR Entry Form    347

FIG. 25

| Home | PC | Tech | Reports | Tasks | Options | DB Sel | Logistics | Admin |

805 Production Control System, *Rev 3.1*
Database In Use: NSW  <u>79</u>

Add New Warranty Equipment For

Step 1: Select either Equipment or NSN

EQUIPMENT: | All  <u>350</u>  |   NSN: | All  <u>351</u>  |

Step 2: Either enter the range of serial numbers
(Any Prefix + First Serial number + Last Serial number + Any postscript)

Prefix: |        First SN: |        Last SN: |        Postscript: <u>352</u>

*or enter the Serial number(s) that are seperated with commas*

<u>353</u>

Step 3: Enter your DD250 or contract information

| Warranty End Date (Req'd) | <u>354</u> |
| Contract number | <u>355</u> |
| Contract CLIN | <u>356</u> |
| Requisition Number | <u>357</u> |
| Delivery Order Number | <u>358</u> |
| DD250 | <u>359</u> |
| DD250 Date | 09/07/2002  <u>360</u> |

Add Items  <u>361</u>

FIG. 26

| Table ACTIVITY | | | | |
|---|---|---|---|---|
| Fieldname | Fieldtype | Length | Precision | Scale |
| UIC | nvarchar | 30 | 0 | 0 |
| UIC_DESC | nvarchar | 160 | 0 | 0 |
| UNIT | nvarchar | 60 | 0 | 0 |
| telephone | nvarchar | 60 | 0 | 0 |
| fax | nvarchar | 40 | 0 | 0 |
| DSN | int | 4 | 10 | 0 |
| POC | nvarchar | 100 | 0 | 0 |
| ID | int | 4 | 10 | 0 |

| Table Equip | | | | |
|---|---|---|---|---|
| Fieldname | Fieldtype | Length | Precision | Scale |
| EQUIPMENT | nvarchar | 100 | 0 | 0 |
| NOMEN | nvarchar | 70 | 0 | 0 |
| NSN | nvarchar | 32 | 0 | 0 |
| Type | nvarchar | 100 | 0 | 0 |
| DataSheet | nvarchar | 100 | 0 | 0 |
| ID | int | 4 | 10 | 0 |

| Table Equip_Task | | | | |
|---|---|---|---|---|
| Fieldname | Fieldtype | Length | Precision | Scale |
| Equipment | nvarchar | 100 | 0 | 0 |
| Task | nvarchar | 160 | 0 | 0 |
| IDKEY | int | 4 | 10 | 0 |
| SubEquipment | nvarchar | 100 | 0 | 0 |
| Step | int | 4 | 10 | 0 |

| Table Equip_Type | | | | |
|---|---|---|---|---|
| Fieldname | Fieldtype | Length | Precision | Scale |
| ID | int | 4 | 10 | 0 |
| Type | nvarchar | 100 | 0 | 0 |

| Table Failure_Code | | | | |
|---|---|---|---|---|
| Fieldname | Fieldtype | Length | Precision | Scale |
| FAILCODE | nvarchar | 10 | 0 | 0 |
| Fail_DESC | nvarchar | 100 | 0 | 0 |
| ID | int | 4 | 10 | 0 |

| Table History | | | | |
|---|---|---|---|---|
| Fieldname | Fieldtype | Length | Precision | Scale |
| JobStatus | nvarchar | 100 | 0 | 0 |
| comments | nvarchar | 510 | 0 | 0 |
| name | nvarchar | 100 | 0 | 0 |
| LogDate | smalldatetime | 4 | 16 | 0 |
| Transdate | smalldatetime | 4 | 16 | 0 |
| Jobnum | int | 4 | 10 | 0 |
| IDKey | int | 4 | 10 | 0 |

FIG. 29A

| | Table PCS | | | | | |
|---|---|---|---|---|---|---|
| | Fieldname | Fieldtype | Length | Precision | Scale | |
| 408 | WORNUM | int | 4 | 10 | 0 | 503' |
| | Type | nvarchar | 100 | 0 | 0 | |
| | EQUIPMENT | nvarchar | 100 | 0 | 0 | 226', 227' |
| | SERIALNUM | nvarchar | 100 | 0 | 0 | 507' |
| | INUNIT | nvarchar | 100 | 0 | 0 | 509', 515' |
| 533' | OUTUNIT | nvarchar | 100 | 0 | 0 | |
| | DATERCD | smalldatetime | 4 | 16 | 0 | 510' |
| | DATERETURN | smalldatetime | 4 | 16 | 0 | 536' |
| | JOBSTATUS | nvarchar | 32 | 0 | 0 | 522' |
| | LABORCOST | float | 8 | 53 | 0 | |
| | PARTSCOST | float | 8 | 53 | 0 | |
| | TOTALCOST | float | 8 | 53 | 0 | |
| 409 | IDKey | int | 4 | 10 | 0 | |
| | ICN | nvarchar | 24 | 0 | 0 | 511' |
| | RequestTask | nvarchar | 100 | 0 | 0 | 224' |
| | INDocument | nvarchar | 100 | 0 | 0 | 513' |
| | ScheduleNumber | nvarchar | 100 | 0 | 0 | 512' |
| | OutDocument | nvarchar | 100 | 0 | 0 | 535' |
| | Comments | nvarchar | 510 | 0 | 0 | 514' |
| | TICN | nvarchar | 100 | 0 | 0 | 534' |
| 222' | TransDate | smalldatetime | 4 | 16 | 0 | 521' |
| | OutgoingStatus | nvarchar | 100 | 0 | 0 | |
| | JobClosed | bit | 1 | 1 | 0 | |
| | Shipdate | smalldatetime | 4 | 16 | 0 | |
| | Shipmode | nvarchar | 100 | 0 | 0 | |
| | Trackingnum | nvarchar | 100 | 0 | 0 | |
| | RDD | smalldatetime | 4 | 16 | 0 | |
| | RequestShipment | bit | 1 | 1 | 0 | |
| | Work_Level | int | 4 | 10 | 0 | |
| | Step | int | 4 | 10 | 0 | 230' |
| | Purposecode | nvarchar | 20 | 0 | 0 | |

| | Table PCS_PARTS | | | | | |
|---|---|---|---|---|---|---|
| | Fieldname | Fieldtype | Length | Precision | Scale | |
| 410 | IDkey | int | 4 | 10 | 0 | |
| | EQUIPMENT | nvarchar | 100 | 0 | 0 | 370' |
| | PARTNUM | nvarchar | 510 | 0 | 0 | 371' |
| | PARTNAME | nvarchar | 510 | 0 | 0 | 372' |
| | PARTNSN | nvarchar | 510 | 0 | 0 | 373' |
| | PARTCOST | float | 8 | 53 | 0 | 374' |
| | Inventcount | smallint | 2 | 5 | 0 | 375' |
| | Inventtrippoint | smallint | 2 | 5 | 0 | 376' |
| | COG | nvarchar | 100 | 0 | 0 | 377' |
| | Refno | nvarchar | 100 | 0 | 0 | 378' |
| | Hide | bit | 1 | 1 | 0 | 379' |
| | LastAccess | smalldatetime | 4 | 16 | 0 | |
| | Location | char | 20 | 0 | 0 | 380' |

FIG. 29B

| Tabl PCS_Repair | | | | | |
|---|---|---|---|---|---|
| Fieldname | Fieldtype | Length | Precision | Scale | |
| LABORHRS | float | 8 | 53 | 0 | 545' |
| REPAIRER | nvarchar | 60 | 0 | 0 | |
| REPAIRDATEIN | smalldatetime | 4 | 16 | 0 | 541' |
| REPAIRDATEOUT | smalldatetime | 4 | 16 | 0 | 547' |
| comments | nvarchar | 500 | 0 | 0 | 551' |
| 411 IDKey | int | 4 | 10 | 0 | |
| 412 JobNum | int | 4 | 10 | 0 | |
| Failcode | nvarchar | 510 | 0 | 0 | 544' |
| Repcode | nvarchar | 510 | 0 | 0 | 555' |
| Partnum | nvarchar | 510 | 0 | 0 | 552' |
| Partqty | int | 4 | 10 | 0 | |
| Partstotalcost | int | 4 | 10 | 0 | 546' |
| JobStatus | nvarchar | 32 | 0 | 0 | 542' |
| Equipment | nvarchar | 100 | 0 | 0 | |
| Serialnum | nvarchar | 100 | 0 | 0 | |
| JobClosed | bit | 1 | 1 | 0 | |
| Task | nvarchar | 100 | 0 | 0 | |
| Work_Level | int | 4 | 10 | 0 | |
| Step | int | 4 | 10 | 0 | |
| Table PCS_Repair_Sub | | | | | |
| Fieldname | Fieldtype | Length | Precision | Scale | |
| LABORHRS | float | 8 | 53 | 0 | |
| REPAIRER | nvarchar | 60 | 0 | 0 | |
| REPAIRDATEIN | smalldatetime | 4 | 16 | 0 | |
| REPAIRDATEOUT | smalldatetime | 4 | 16 | 0 | |
| comments | nvarchar | 500 | 0 | 0 | |
| 413 IDKey | int | 4 | 10 | 0 | |
| 414 JobNum | int | 4 | 10 | 0 | |
| Failcode | nvarchar | 510 | 0 | 0 | |
| Repcode | nvarchar | 510 | 0 | 0 | |
| Partnum | nvarchar | 510 | 0 | 0 | |
| Partqty | int | 4 | 10 | 0 | |
| Partstotalcost | int | 4 | 10 | 0 | |
| JobStatus | nvarchar | 32 | 0 | 0 | |
| Equipment | nvarchar | 100 | 0 | 0 | |
| Serialnum | nvarchar | 100 | 0 | 0 | |
| JobClosed | bit | 1 | 1 | 0 | |
| Work_Level | int | 4 | 10 | 0 | |
| Step | int | 4 | 10 | 0 | |
| Task | nvarchar | 100 | 0 | 0 | |
| Table Repair_Code | | | | | |
| Fieldname | Fieldtype | Length | Precision | Scale | |
| REPAIRCODE | nvarchar | 100 | 0 | 0 | |
| Repair_DESC | nvarchar | 100 | 0 | 0 | 549' |
| 415 ID | int | 4 | 10 | 0 | |

FIG. 29C

| Table Conditon_Code | | | | |
|---|---|---|---|---|
| Fieldname | Fieldtype | Length | Precision | Scale |
| ID | int | 4 | 10 | 0 |
| Code | nvarchar | 100 | 0 | 0 |
| Task_Desc | nvarchar | 100 | 0 | 0 |
| Color | nvarchar | 100 | 0 | 0 |

| Table Data_users | | | | |
|---|---|---|---|---|
| Fieldname | Fieldtype | Length | Precision | Scale |
| ID | int | 4 | 10 | 0 |
| Name | char | 50 | 0 | 0 |
| LogDate | datetime | 8 | 0 | 0 |

| Table PCS_Database_List | | | | |
|---|---|---|---|---|
| Fieldname | Fieldtype | Length | Precision | Scale |
| Name | nvarchar | 100 | 0 | 0 |
| PCS_ID | int | 4 | 10 | 0 |
| IDKEY | int | 4 | 10 | 0 |

| Table PCS_Name_List | | | | |
|---|---|---|---|---|
| Fieldname | Fieldtype | Length | Precision | Scale |
| Person | nvarchar | 100 | 0 | 0 |
| IDKey | int | 4 | 10 | 0 |
| Payscale | nvarchar | 16 | 0 | 0 |
| Password | nvarchar | 100 | 0 | 0 |
| Database | nvarchar | 500 | 0 | 0 |
| email | nvarchar | 100 | 0 | 0 |
| Permission | nvarchar | 240 | 0 | 0 |
| PersonID | nvarchar | 100 | 0 | 0 |
| Org | nvarchar | 40 | 0 | 0 |

| Table PCS_Name_List_temp | | | | |
|---|---|---|---|---|
| Fieldname | Fieldtype | Length | Precision | Scale |
| Person | nvarchar | 100 | 0 | 0 |
| IDKey | int | 4 | 10 | 0 |
| Payscale | nvarchar | 16 | 0 | 0 |
| Password | nvarchar | 100 | 0 | 0 |
| Database | nvarchar | 500 | 0 | 0 |
| email | nvarchar | 100 | 0 | 0 |
| Permission | nvarchar | 240 | 0 | 0 |
| PersonID | nvarchar | 100 | 0 | 0 |

| Table Permission | | | | |
|---|---|---|---|---|
| Fieldname | Fieldtype | Length | Precision | Scale |
| Permission_ID | int | 4 | 10 | 0 |
| Permission_name | nvarchar | 100 | 0 | 0 |

FIG. 29D

| Tabl Purpose_Code | | | | |
|---|---|---|---|---|
| Fieldname | Fieldtype | Length | Precision | Scale |
| ID | int | 4 | 10 | 0 |
| Sponsor | nvarchar | 100 | 0 | 0 |
| PurposeCode | nvarchar | 100 | 0 | 0 |
| ILSMgrCode | nvarchar | 100 | 0 | 0 |
| ILSMMgr | nvarchar | 100 | 0 | 0 |
| Databasename | nvarchar | 100 | 0 | 0 |
| Table Request_Task | | | | |
| Fieldname | Fieldtype | Length | Precision | Scale |
| Request_task | nvarchar | 100 | 0 | 0 |
| ID | int | 4 | 10 | 0 |
| Table Status | | | | |
| Fieldname | Fieldtype | Length | Precision | Scale |
| Status | nvarchar | 100 | 0 | 0 |
| Status_Desc | nvarchar | 100 | 0 | 0 |
| ID | int | 4 | 10 | 0 |
| Table WOR | | | | |
| Fieldname | Fieldtype | Length | Precision | Scale |
| ID | int | 4 | 10 | 0 |
| Requester_name | nvarchar | 100 | 0 | 0 |
| Code | nvarchar | 100 | 0 | 0 |
| Requestdate | smalldatetime | 4 | 16 | 0 |
| Urgent_Task | nvarchar | 100 | 0 | 0 |
| Request_Task | nvarchar | 100 | 0 | 0 |
| Description | nvarchar | 510 | 0 | 0 |
| itemequipstockequipment | ntext | 16 | 0 | 0 |
| itemsupplycode | nvarchar | 160 | 0 | 0 |
| itempurposecode | nvarchar | 160 | 0 | 0 |
| quantity | int | 4 | 10 | 0 |
| otherdesc | ntext | 16 | 0 | 0 |
| deliverables | ntext | 16 | 0 | 0 |
| pc_wbs | nvarchar | 100 | 0 | 0 |
| pc_charge | nvarchar | 100 | 0 | 0 |
| tech_wbs | nvarchar | 100 | 0 | 0 |
| tech_charge | nvarchar | 100 | 0 | 0 |
| material_wbs | nvarchar | 100 | 0 | 0 |
| material_charge | nvarchar | 100 | 0 | 0 |
| WOR_approve | bit | 1 | 1 | 0 |
| ContractNum | nvarchar | 100 | 0 | 0 |
| CLIN | nvarchar | 100 | 0 | 0 |
| Requisition | nvarchar | 510 | 0 | 0 |
| NewQty | int | 4 | 10 | 0 |
| ProjectOwner | nvarchar | 100 | 0 | 0 |
| Company | nvarchar | 240 | 0 | 0 |
| PC_reject | nvarchar | 100 | 0 | 0 |
| Databasename | nvarchar | 80 | 0 | 0 |

FIG. 29E

Table 805_RFI_Num

| Fieldname | Fieldtype | Length | Precision | Scale |
|---|---|---|---|---|
| ID | int | 4 | 10 | 0 |
| RFINum | nvarchar | 100 | 0 | 0 |

426

Table Activity

| Fieldname | Fieldtype | Length | Precision | Scale |
|---|---|---|---|---|
| ID | int | 4 | 10 | 0 |
| Activity | nvarchar | 100 | 0 | 0 |

427

Table RFI Assignments

| Fieldname | Fieldtype | Length | Precision | Scale |
|---|---|---|---|---|
| IDRFIAssignement | int | 4 | 10 | 0 |
| NSN | nvarchar | 100 | 0 | 0 |
| Equipment | nvarchar | 100 | 0 | 0 |
| Qty | int | 4 | 10 | 0 |
| Activity | nvarchar | 100 | 0 | 0 |
| UIC | nvarchar | 100 | 0 | 0 |
| DtdJulian | nvarchar | 100 | 0 | 0 |
| RFINum | nvarchar | 100 | 0 | 0 |
| DtdRequested | smalldatetime | 4 | 16 | 0 |
| Remarks | ntext | 16 | 0 | 0 |
| ChargeNubmer | nvarchar | 100 | 0 | 0 |
| Name | nvarchar | 100 | 0 | 0 |
| Building | nvarchar | 100 | 0 | 0 |
| Customer | nvarchar | 100 | 0 | 0 |

| Table Tube_data ||||||
|---|---|---|---|---|---|
| Fieldname | Fieldtype | Length | Precision | Scale | |
| 429 Tube_ID | int | 4 | 10 | 0 | |
| Customer | nvarchar | 80 | 0 | 0 | |
| NSN | nvarchar | 40 | 0 | 0 | |
| Serialnum | nvarchar | 100 | 0 | 0 | |
| 430 Jobnum | int | 4 | 10 | 0 | |
| Aimsfile | nvarchar | 100 | 0 | 0 | 561' |
| AIMSMTF | nvarchar | 20 | 0 | 0 | 562' |
| EBI | nvarchar | 20 | 0 | 0 | 564' |
| MaxGain | nvarchar | 20 | 0 | 0 | 565' |
| MinGain | nvarchar | 20 | 0 | 0 | 566' |
| Icurrent | nvarchar | 20 | 0 | 0 | 567' |
| SN | nvarchar | 20 | 0 | 0 | 568' |
| Cres | nvarchar | 20 | 0 | 0 | 569' |
| Z1S1 | nvarchar | 20 | 0 | 0 | 570' |
| Z1S2 | nvarchar | 20 | 0 | 0 | 571' |
| Z1S3 | nvarchar | 20 | 0 | 0 | 572' |
| Z1S4 | nvarchar | 20 | 0 | 0 | 573' |
| Z1S5 | nvarchar | 20 | 0 | 0 | 574' |
| Z1S6 | nvarchar | 20 | 0 | 0 | 575' |
| Z2S1 | nvarchar | 20 | 0 | 0 | 576' |
| Z2S2 | nvarchar | 20 | 0 | 0 | 577' |
| Z2S3 | nvarchar | 20 | 0 | 0 | 578' |
| Z2S4 | nvarchar | 20 | 0 | 0 | 579' |
| Z2S5 | nvarchar | 20 | 0 | 0 | 580' |
| Z2S6 | nvarchar | 20 | 0 | 0 | 581' |
| Z3S1 | nvarchar | 20 | 0 | 0 | 582" |
| Z3S2 | nvarchar | 20 | 0 | 0 | 583' |
| Z3S3 | nvarchar | 20 | 0 | 0 | 584' |
| Z3S4 | nvarchar | 20 | 0 | 0 | 585' |
| Z3S5 | nvarchar | 20 | 0 | 0 | 586' |
| Z3S6 | nvarchar | 20 | 0 | 0 | 587' |
| FailCode | ntext | 16 | 0 | 0 | 588' |
| JobStatus | nvarchar | 20 | 0 | 0 | 589' |
| TravelerDate | smalldatetime | 4 | 16 | 0 | 590' |
| laborhrs | nvarchar | 20 | 0 | 0 | 591' |
| Comments | nvarchar | 510 | 0 | 0 | |
| Repairer | nvarchar | 320 | 0 | 0 | |
| R1 | nvarchar | 20 | 0 | 0 | 563' |

FIG. 29G

| Table Tube_spec ||||| 
|---|---|---|---|---|
| Fieldname | Fieldtype | Length | Precision | Scale |
| ID | int | 4 | 10 | 0 |
| Disp_NSN | nvarchar | 40 | 0 | 0 |
| Disp_CenRes | nvarchar | 20 | 0 | 0 |
| Disp_EBIMax | nvarchar | 20 | 0 | 0 |
| Disp_MaxGain_Min | nvarchar | 20 | 0 | 0 |
| Disp_MaxGain_Max | nvarchar | 20 | 0 | 0 |
| Disp_MinGain_Min | nvarchar | 20 | 0 | 0 |
| Disp_MinGain_Max | nvarchar | 20 | 0 | 0 |
| Disp_ICurrent | nvarchar | 20 | 0 | 0 |
| Disp_SNR | nvarchar | 20 | 0 | 0 |
| Disp_Z1S1 | nvarchar | 20 | 0 | 0 |
| Disp_Z1S2 | nvarchar | 20 | 0 | 0 |
| Disp_Z1S3 | nvarchar | 20 | 0 | 0 |
| Disp_Z1S4 | nvarchar | 20 | 0 | 0 |
| Disp_Z1S5 | nvarchar | 20 | 0 | 0 |
| Disp_Z1S6 | nvarchar | 20 | 0 | 0 |
| Disp_Z2S1 | nvarchar | 20 | 0 | 0 |
| Disp_Z2S2 | nvarchar | 20 | 0 | 0 |
| Disp_Z2S3 | nvarchar | 20 | 0 | 0 |
| Disp_Z2S4 | nvarchar | 20 | 0 | 0 |
| Disp_Z2S5 | nvarchar | 20 | 0 | 0 |
| Disp_Z2S6 | nvarchar | 20 | 0 | 0 |
| Disp_Z3S1 | nvarchar | 20 | 0 | 0 |
| Disp_Z3S2 | nvarchar | 20 | 0 | 0 |
| Disp_Z3S3 | nvarchar | 20 | 0 | 0 |
| Disp_Z3S4 | nvarchar | 20 | 0 | 0 |
| Disp_Z3S5 | nvarchar | 20 | 0 | 0 |
| Disp_Z3S6 | nvarchar | 20 | 0 | 0 |
| Disp_notes | nvarchar | 510 | 0 | 0 |

FIG. 29H

| Table QDR | | | | | |
|---|---|---|---|---|---|
| Fieldname | Fieldtype | Length | Precision | Scale | |
| Equipment | char | 100 | 0 | 0 | 365' |
| Serial_num | char | 100 | 0 | 0 | 367' |
| QDR_num | char | 100 | 0 | 0 | |
| QDRdate | datetime | 8 | 0 | 0 | |
| Replacement_Serialnum | char | 100 | 0 | 0 | |
| Reported_Failure | nchar | 510 | 0 | 0 | |
| QDR_status | char | 50 | 0 | 0 | |
| RMA | char | 100 | 0 | 0 | |
| Results | char | 255 | 0 | 0 | |
| Final_disposition | char | 255 | 0 | 0 | |
| MFG | char | 100 | 0 | 0 | |
| Closing_letter | char | 100 | 0 | 0 | |
| Closing_letterdate | datetime | 8 | 0 | 0 | |
| OC | bit | 1 | 1 | 0 | |
| Notes | nchar | 510 | 0 | 0 | |
| Joblink | int | 4 | 10 | 0 | |
| Return_joblink | int | 4 | 10 | 0 | |
| Warranty_link | int | 4 | 10 | 0 | |
| QDR_ID (432) | int | 4 | 10 | 0 | |
| Customer | char | 100 | 0 | 0 | |
| Activity | char | 100 | 0 | 0 | |
| Return_mfg | bit | 1 | 1 | 0 | |
| RMAdate | datetime | 8 | 0 | 0 | |
| Finaldate | datetime | 8 | 0 | 0 | |

| Table Warranty | | | | | |
|---|---|---|---|---|---|
| Fieldname | Fieldtype | Length | Precision | Scale | |
| Equipment | char | 100 | 0 | 0 | 350' |
| Serial_num | char | 100 | 0 | 0 | 353' |
| Warranty_Enddate | datetime | 8 | 0 | 0 | 354' |
| Customer | char | 100 | 0 | 0 | |
| Contract | char | 100 | 0 | 0 | 355' |
| CLIN | char | 100 | 0 | 0 | 356' |
| Delivery_ordernum | char | 100 | 0 | 0 | 358' |
| DD250 | char | 100 | 0 | 0 | 359' |
| DD250Date | datetime | 8 | 0 | 0 | 360' |
| Warranty_ID (433) | int | 4 | 10 | 0 | |
| Req_num | char | 100 | 0 | 0 | 357' |

FIG. 29I

| Table ECP | | | | | |
|---|---|---|---|---|---|
| Fieldname | Fieldtype | Length | Precision | Scale | |
| ECP_name | nvarchar | 100 | 0 | 0 | 99' |
| ECP_desc | ntext | 16 | 0 | 0 | 87' |
| 434 ECPID | int | 4 | 10 | 0 | |
| ECP_date | smalldatetime | 4 | 16 | 0 | 88' |
| ECP_requester | nvarchar | 100 | 0 | 0 | 89' |

| Table Help | | | | |
|---|---|---|---|---|
| Fieldname | Fieldtype | Length | Precision | Scale |
| 435 IDKey | int | 4 | 10 | 0 |
| Pagename | nvarchar | 100 | 0 | 0 |
| RefPage | nvarchar | 100 | 0 | 0 |
| HelpInfo | ntext | 16 | 0 | 0 |

FIG. 29J

ADAPTIVE WEB-BASED ASSET CONTROL SYSTEM

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates to database technology and, more particularly, to adaptive data management systems that may be accessed via the world wide web and, even more particularly, asset control systems utilized to manipulate, organize, and display product and/or component data, in a military repair/storage depot environment, despite constantly changing requirements due to various third party (i.e. customer) demands and/or funding restrictions.

2. Description of the Background

A military repair/storage depot is an extremely dynamic environment. At any given moment, any number of high- and low-tech systems/components ("assets") may be in the process of being transferred (i.e. shipped) into, or out of, the facility. As the name "repair/storage" depot implies, the incoming and outgoing assets generally belong to third parties and are present at the facility to take advantage of either the technical skills/knowledge of the personnel stationed there, or the warehouse space that is available on-site. Assets present for either reason must be carefully tracked to ensure that they are readily available to their owners. In this regard, the assets and any allocation of the depot's resources (e.g. repair personnel, storage space) must be matched in the most efficient manner possible.

Inefficiencies in the tracking of assets and the allocation of resources can result in significant asset unavailability and increased labor costs. Therefore, it is particularly important with large scale repair/storage contracting to provide a database system capable of proper and timely asset control despite widely varying third party needs.

Four examples of widely varying third party requirements are as follows: Customer A has simple assets but requires (1) any shipment of those assets, into or out of a repair/storage facility, to be accompanied by specified shipping documents and (2) any database containing information about those assets to be secure and to provide limited access for certain viewers. Customer B has simple assets, although quite different from those of Customer A, requiring only minimal database security (i.e. allowing the data to be shared by many individuals) and utilizes a traditional supply support system (e.g. applying integrated logistics support "ILS" management techniques as described within DEF STAN 00-60 during the project life cycle). Customer C is a governmental entity, such as a Navy or Army base, dealing with complex products that contain sub-products. Customer D requires paper movement only (i.e. a typical support role for inventory management). In the context of an asset control system, each of these hypothetical third parties will require a different customer profile. Moreover, as time passes, an existing customer's profile (e.g. data access requirements, shipping procedures) may change, funding sources may change, and new third party accounts will need to be established. Each of these changes will necessitate one or more changes to the database system tracking the various assets.

There is commercially available software that may be utilized for asset control (i.e. to establish job plans and work plans). One such job planning software package is MAXIMO®, a program developed and available from PSDI, Inc. MAXIMO® is designed to help organizations reduce equipment downtime, closely control and track maintenance expenses, cut spare parts inventories and costs, improve safety, increase purchasing efficiency, and more effectively deploy productive assets, personnel, and other resources. MAXIMO® is an advanced materials management solution that offers web-based storeroom management. Customers can use their Internet browser to create and send material requisitions directly via MAXIMO®, where they are filled from storeroom inventory or by purchase from a manufacturer or complementary supplier. Orders can be executed electronically. Unfortunately, while MAXIMO®, as supplied by PSDI, could be used to address some aspects of the present need (i.e. asset control in a military repair/storage depot environment), it possesses only limited flexibility and, therefore, would require the expenditure of a significant amount of capital to complete the customization/reprogramming effort needed to render it fully functional.

Other commercially available software programs that are useful in resource planning are job standards programs. These programs are used to create, maintain, and manipulate standards for maintenance work (i.e. detailing the steps to be taken and man-hours/trades needed to complete a task), allowing a user to construct new standards using information retained in a database. An example of this type of software is AutoMOST® available from H.B. Maynard and Company, Inc.

There are also a number of patents that are illustrative of "adaptive data management" software applications. For example, U.S. Pat. Nos. 5,970,475 to Barnes et al. (see reference numeral 14 in FIG. 2) and 6,157,928 to Sprenger et al. (See reference numeral 272 in FIG. 5) disclose data access via Internet or web-based applications. Additionally, the Barnes et al. patent provides an example of customer/user-definable data formats/templates.

Thus, dynamic scalable web-enabled databases with customer/user-definable data formats/templates are fairly well-known. However, none of the foregoing examples are capable of gathering data from customers in real time, and then constructing data files on-the-fly. It would be greatly advantageous to provide an adaptive web-based asset control system that utilizes web technology to gather and present asset control data despite constantly changing requirements due to various third party demands and/or funding restrictions.

SUMMARY OF THE INVENTION

It is, therefore, the primary object of the present invention to provide an improved asset control system for use in a military repair/supply depot environment.

It is another object of the present invention to provide an improved asset control system that is Internet or web accessible.

Yet another object of the present invention is to provide an improved asset control system that accommodates constantly changing requirements due to various user demands and/or funding restrictions.

It is another object of the present invention to provide an improved asset control system that is capable of gathering data from users in real time and constructing data files on-the-fly.

It is still another object of the present invention to provide an improved asset control system that is simple and straightforward for new users to learn and use.

These and other objects are accomplished by an adaptive, web-based asset control system that utilizes web technology to gather and present asset control data in an environment with constantly changing requirements due to various third party (e.g. customer) demands and/or funding restrictions. The present system tracks third party assets, provides real-time data regarding current status, and assists in returning the assets to the customer in a more timely fashion. Moreover, the system is adaptable and relatively non-complex so that it can easily be learned and utilized by all users.

The present invention possesses the means to adapt to constantly changing user requirements through its use of a Cold Fusion database interface to a set of data files that can be constructed and reconstructed on-the-fly. Multiple third party structures are supported with one central data file that handles the security logs and one central tasking data bank for tracking specific third party funding/tasking. The present invention incorporates log in security and limits data accessibility based on the assigned rights and/or specific duties of the logged in user. The present invention includes, as will be discussed in detail below, "Home", "PC", "Tech", "Reports", "Tasks", "Options", "DB Sel", "Logistics", and "Admin" modules/interfaces. The present invention also interfaces with bar code readers to provide for the gathering of asset data and to allow users to enter data as it happens (e.g. technicians entering repair data) for uploading at a later time.

As mentioned above, the present invention utilizes a Cold Fusion server interface. MacroMedia® Cold Fusion MX is a server platform that allows developers to easily integrate Internet applications with databases, XML, web services, etc. Specifically, Cold Fusion Studio and Cold Fusion Server 4.01 were used.

In use, the collected data is stored in Microsoft SQL 7.0 server database tables and is made accessible with existing Microsoft products (e.g. Internet Explorer 4.0/5.0, Access 97).

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 2B is a screen print of the request changes to PCS software screen accessed via hyperlink 83 of FIG. 2A.

FIG. 4 shows a screen layout for the entry form for a new job.

FIG. 6 shows an example of a shop traveler printout.

FIG. 7B shows a screen layout for editing the information associated with an in-process job.

FIG. 8 shows an example of a unique third party requirement a screen layout of an Image Intensifier Test Data Sheet prior to its completion by a repair technician.

FIG. 9 shows a screen layout for an Image Intensifier Test Data Sheet after it has been completed by a repair technician.

FIG. 14 shows an example of a report structure listing the in-house items that are in a user-selected condition.

FIG. 16A shows an example of an "Parts for . . . " report structure as sorted by equipment type.

FIG. 16B is an example of the information accessed via an "Edit" hyperlink 192 of FIG. 16A.

FIG. 17 is a screen print of the information shown when a user clicks on the "Tasks" button 65.

FIGS. 18A-C show a screen layout of a Task Request Page prior to its completion by a user.

FIG. 19 shows a screen print of a completed Task Request Page.

FIG. 20 shows a screen print of a Task Request Number Lookup.

FIG. 21 shows a screen layout of a Request for Issue Entry Form partially completed by a user.

FIG. 22 is a screen print of the information shown when a user clicks on the "Options" button 66.

FIG. 23 shows a screen print of the Repair Codes Descriptions.

FIG. 25 is a screen print of the information shown when a user clicks on the "Logistics" button 68.

FIG. 26 shows a layout of an "Add New Warranty Equipment" screen prior to its completion by a user.

FIGS. 29A-J show the data tables and associated field definitions for a preferred embodiment of the present invention.

DETAILED DESCRIPTION OF THE PREFERRED EMBODIMENTS

Figure 1A:
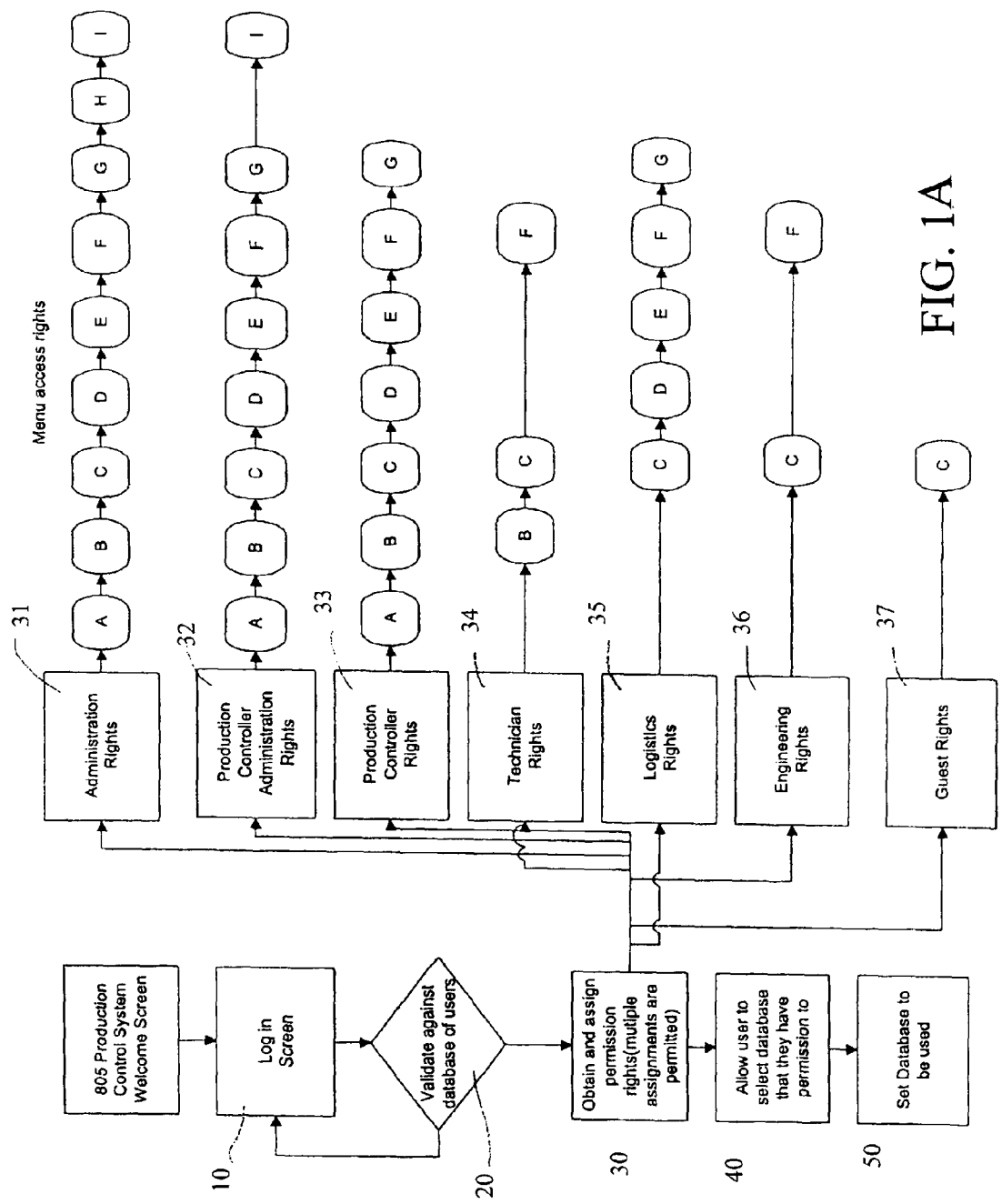
FIG. 1A is a flow chart outlining the log in process for a preferred embodiment of the present invention.

A number of acronyms are found in the instant specification and FIGS. 1A-29J. The acronyms are defined as follows:

CLIN—Contract Line Item Number
COG—Cognizance Code
DD250—a form for accepting or rejecting a purchased item/asset
ECP—Engineering Change Proposal ILSMS—Integrated Logistics Supply Maintenance System
ICN—Induction Control Number
NSN—National Stock Number
QDR—Quality Deficiency Report
RMA—Return Material Authorization
UIC—Unit Identification Code
WBS—Work Breakdown Structure The present invention is an adaptive web-based product control system that utilizes web technology to gather and present product control data in an environment with constantly changing requirements due to various customer demands and/or funding restrictions. The present system tracks customer assets, provides real-time data of current status, and helps to return the assets to the customer in a more timely fashion. Moreover, the system is adaptable and relatively non-complex so that it can easily be learned by all users.

The adaptive web-based product control system according to the present invention utilizes a Cold Fusion server interface. MacroMedia® Cold Fusion MX is a server platform that allows developers to easily integrate Internet applications with databases, XML, web services, etc. Specifically, Cold Fusion Studio and Cold Fusion Server 4.01 were used. Cold Fusion Studio and Cold Fusion Server 4.01 provide the dynamic interface to the gathered data. In addition, common web software (e.g. Cascading Style Sheets, Java-script and ASP) adds enhancements and speed to improve the user interactions with the data.

The collected data is stored in Microsoft SQL 7.0 server database tables and is made accessible with existing Microsoft products (i.e. Internet Explorer 4.0/5.0, Access 97).

The concept for this invention is the utilization of a Cold Fusion database interface with a set of data files that can be constructed and re-constructed on the fly (i.e. DHMTL concepts), allowing the software to adapt to needs of different customers. Due to their changing environments, customers may change profiles at any time. The present invention provides for the creation of customer accounts (i.e. unique databases—concept proof is provided in Access 97, but could be any web accessible database) by gathering minimum baseline data then populating data tables that change the presentation of information so that unique data can be gathered/displayed for that customer (i.e. trends may be based on different hardware repair procedures and parts). Above this customer layer, lies a control system that gathers typical and common product control data (i.e. cost center numbers, status codes, tasking that directs work).

The invention is structured to be separate data files with its unique data tables that address the needs of each customer. At present there are eleven different customer structures with one central data file that handles the security logs and a central tasking data bank for tracking funding and specific tasking to the repair shop. The invention utilizes log on security and assigns permission rights and limits the accessibility of the site to specific duties of the log-in user.

Software Architecture

The software includes a multi-step Log In procedure with various levels of user rights, a "Home" module/interface, a "PC" (i.e. product control) module/interface, a "Tech" (i.e. technical data input) module/interface, a "Reports" module/interface, a "Tasks" module/interface, an "Options" module/interface, a "DB Sel" (i.e. database selection) module/interface, a "Logistics" module/interface, and an "Admin" (i.e. system administration) module/interface. Each of the modules/interfaces is described in greater detail below.

Log in Procedure/User Rights

The flowchart of FIG. 1A shows the steps required to log in to the production control system of the present invention. After validating, at step 20, the information entered by the user on the log in screen (see FIG. 1B) at step 10, the user is provided, at step 30, with the menu access rights commensurate with his/her status as defined in 31 through 37.

Figure 1B:
FIG. 1B is a screen print of the log in screen utilized at step 10 of FIG. 1A.

The log in screen of FIG. 1B provides a user with a field 12 in which his/her name is entered and a second field 13 in which a password is entered. Once the appropriate information has been entered into the two fields 12, 13, the user clicks on button 14 to proceed to the screen shown in FIG. 2A (see discussion below). Hyperlink 15 is provided to allow a user to set up a new account. Hyperlink 16 provides any user with the opportunity to forward information to the individual in charge of maintaining the software application of the present invention (e.g. to report a "bug").

The menu access rights, as indicated by "A" through "I", are defined as follows; "A" refers to production controller links or the "PC" button 62 at the top of a typical screen layout (see FIG. 2A), "B" refers to technician/technical data links or the "Tech" button 63, "C" refers to report links or the "Reports" button 64, "D" refers to job task links or the "Tasks" button 65, "E" refers to program options or the "Options" button 66, "F" refers to database selection or the "DB Sel" button 67, "G" refers to logistics links or the "Logistics" button 68, "H" refers to administration links or the "Admin" button 69, and "I" refers to production controller administration rights or a sub-menu item associated with the "PC" button. Each of the buttons controls access to a specific module/interface.

Once the appropriate menu access right has been provided, the user is allowed to select and set, at steps 40 and 50, respectively, the database in which he/she will operate. This is accomplished via the database selection screen shown in FIG. 1C. At the database selection screen, the user is provided with the means to select one of the databases to which he/she has access rights via the choices shown on the drop down menu at 43, which then appears in field 42, prior to clicking on the "Choose" button 44.

Figure 1C:
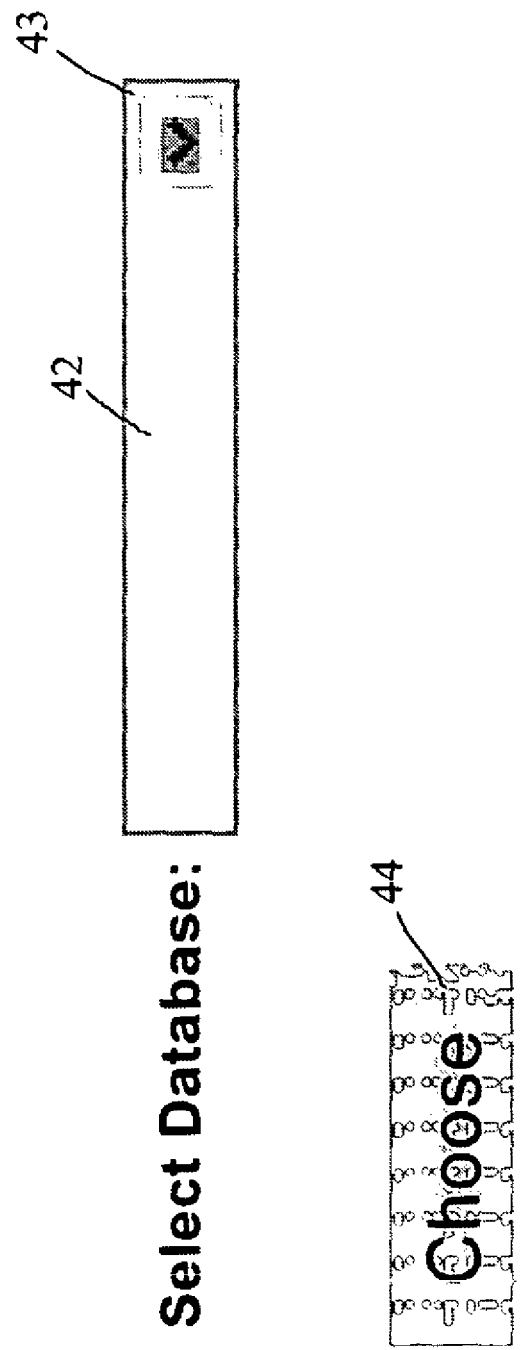
FIG. 1C is a screen print of the database selection screen utilized at steps 40 and 50 of FIG. 1A.

The following table shows the correlation between the data entered via the screens shown in FIGS. 1B and 1C and the data tables of FIGS. 29A-J:

| FIG. | Data Entry Point Reference Numeral | FIG. | Data Table/Field Reference Numeral |
|------|------------------------------------|------|------------------------------------|
| 1B | 12 | 29D | 12' |
| 1B | 13 | 29D | 13' |
| 1C | 42 | 29D | 42' |
| 1C | 43 | 29D | 43' |

"Home" Module/Interface

Figure 2A:
FIG. 2A is a screen print of the information shown when a user clicks on the "Home" button 61.

A software application is typically provided with a home screen that is made available to a logged in user. FIG. 2A is a screen print of the information shown when a user clicks on the "Home" button 61. In addition to indicating, at 70 and 79, respectively, the user's name/ID and the database into which the named user is logged in, a series of hyperlinks 71-85 is provided.

Hyperlinks 71-78 replicate the functionality associated with buttons 62-69. This replicated functionality is provided because some users prefer to navigate via hyperlinks while others prefer buttons. Hyperlinks 80-85 provide access to additional functional areas of the present invention. For example, hyperlink 82 provides for the changing of the user's password and hyperlink 84 allows a user to download the true type font required for the printing of bar codes (i.e. a set up step required prior to the use of a barcode reader for technical data input). Additionally, hyperlink 83 provides access to the screen shown in FIG. 2B where users may request/propose changes to the software application of the present invention by indicating the appropriate software sub-section via the choices shown on the drop down menu at 86, which then appears in field 99, and entering (1) a description of the request/proposal at 87, (2) the date of the request/proposal at 88, and (3) his/her name at 89.

The following table shows the correlation between the data entered via the screen shown in FIG. 2B and the data tables of FIGS. 29A-J:

| FIG. | Data Entry Point Reference Numeral | FIG. | Data Table/Field Reference Numeral |
|---|---|---|---|
| 2B | 87 | 29J | 87' |
| 2B | 88 | 29J | 88' |
| 2B | 89 | 29J | 89' |
| 2B | 99 | 29J | 99' |

"PC" Module/Interface

Figure 3:
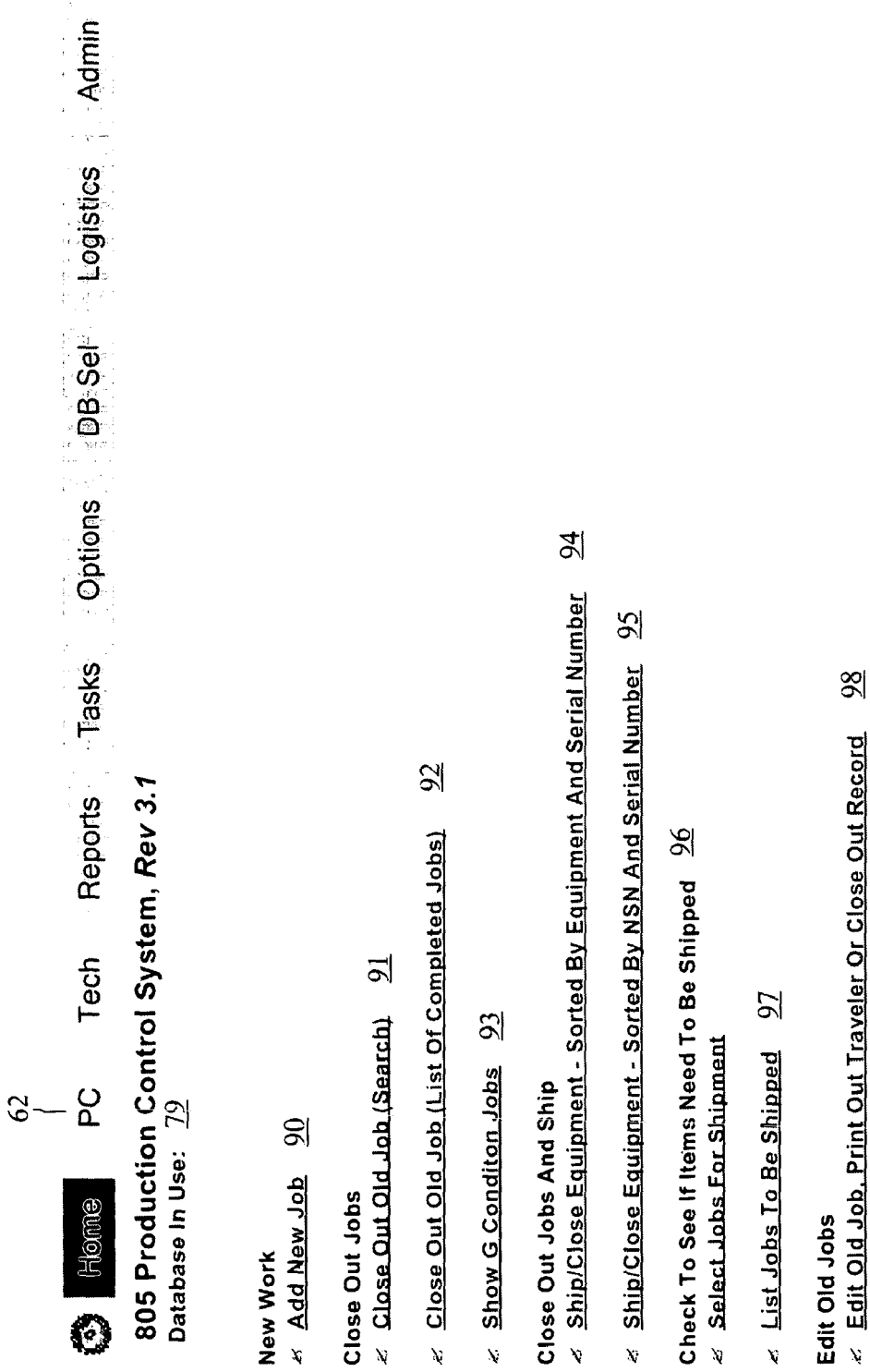
FIG. 3 is a screen print of the information shown when a user clicks on the "PC" button 62.

Asset control software must include the means for creating new data records or editing previously entered information. FIG. 3 is a screen print of the information shown when a user clicks on the "PC" button 62. In addition to indicating, at 79, the database into which the user is logged in, a series of hyperlinks 90-98 is provided.

Hyperlink 90 provides access to the screen shown in FIG. 4 into which data is entered by the user to create a new job and associated serial number. The data entered includes "Today's Date" in field 222, the "NSN" via drop down menu 227 which then appears in field 505 or the "Equipment" via drop down menu 226 which then appears in field 501, the "Task Request Number" in field 503, the "Purpose Code" via drop down menu 504 which then appears in field 230, the "Requested Task" via drop down menu 506 which then appears in field 224, the "Serial Number" in field 507, the "Owner" via drop down menu 502 which then appears in field 509 or the "UIC" via drop down menu 508 which then appears in field 515, the "Transfer Date In" in field 510, the "ICN" in field 511, the "Schedule Control Number" in field 512, the "Incoming Document Number" in field 513, and "Comments" in field 514.

Hyperlinks 91-93 provide access to data input screens (not shown in the Figures) where existing jobs may be closed out or queried as to condition. Hyperlinks 94, 95 provide access to data input screens (not shown in the Figures) where information on closed out/shipped jobs may be sorted and displayed by serial number and equipment description, or by serial number and national stock number (NSN). Hyperlinks 96, 97 provide access to data input screens (not shown in the Figures) where existing jobs may be selected and/or listed for shipment.

Figure 5:
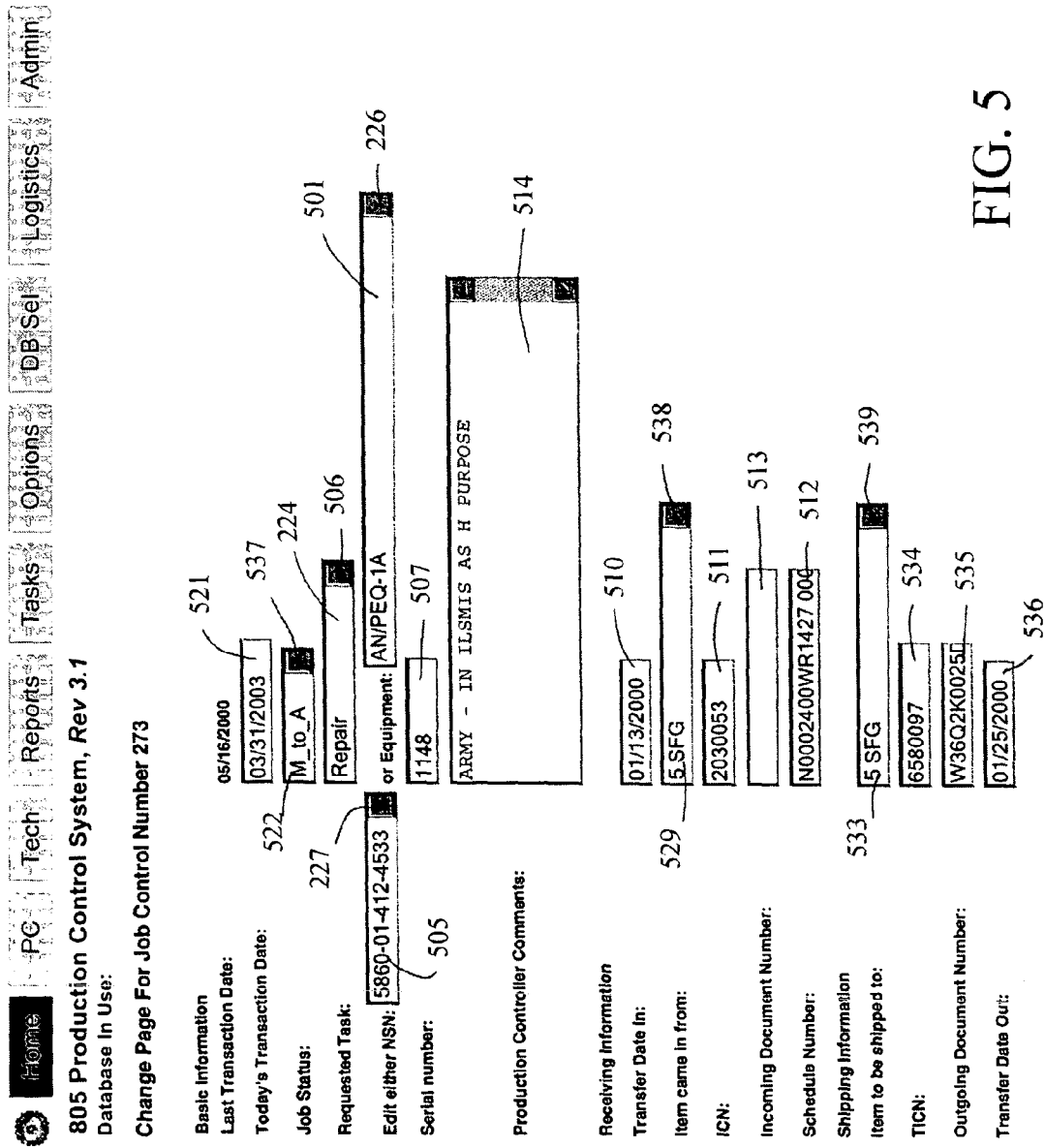
FIG. 5 shows a screen layout for editing the information associated with an old job.

Finally, hyperlink 98 provides access to the screen shown in FIG. 5 into which data is entered by the user to edit the information associated with a specific old job. The data that may be edited includes "Today's Transaction Date" in field 521, the "Job Status" via drop down menu 537 which then appears in field 522, the "Requested Task" via drop down menu 506 which then appears in field 224, the "NSN" via drop down menu 227 which then appears in field 505 or the "Equipment" via drop down menu 226 which then appears in field 501, the "Serial Number" in field 507, the "Production Controller Comments" in field 514, the "Transfer Date In" in field 510, the "Item came in from" via drop down menu 538 which then appears in field 529, the "ICN" in field 511, the "Incoming Document Number" in field 513, the "Schedule Number" in field 512, the "Item to be shipped to" via drop down menu 539 which then appears in field 533, the "TICN" in field 534, the "Outgoing Document Number" in field 535, and the "Transfer Date Out" in field 536.

Hyperlink 98 also allows the user to generate a hard copy shop traveler such as that shown in FIG. 6. A shop traveler, showing information such as job number 101, serial number 102, and/or NSN 103, generally accompanies the equipment as it proceeds through the various repair steps/shops. The traveler also includes space 104 where technicians may handwrite additional information that may be added to the present invention's computer data record at a later time. In general, the space 104 will only be utilized when, for some reason, a technician's computer workstation is down.

The following table shows the correlation between the data entered via the screens shown in FIGS. 4 and 5 and the data tables of FIGS. 29A-J:

| FIG. | Data Entry Point Reference Numeral | FIG. | Data Table/Field Reference Numeral |
|---|---|---|---|
| 4 | 222 | 29B | 222' |
| 4, 5 | 224 | 29B | 224' |
| 4, 5 | 226 | 29B | 226' |
| 4, 5 | 227 | 29B | 227' |
| 4 | 230 | 29B | 230' |
| 4, 5 | 501 | 29A | 501' |
| 4 | 502 | 29A | 502' |
| 4 | 503 | 29B | 503' |
| 4 | 504 | 29E | 504' |
| 4, 5 | 505 | 29A | 505' |
| 4, 5 | 506 | 29E | 506' |
| 4, 5 | 507 | 29B | 507' |
| 4 | 508 | 29A | 508' |
| 4 | 509 | 29B | 509' |
| 4, 5 | 510 | 29B | 510' |
| 4, 5 | 511 | 29B | 511' |
| 4, 5 | 512 | 29B | 512' |
| 4, 5 | 513 | 29B | 513' |
| 4, 5 | 514 | 29B | 514' |
| 4 | 515 | 29B | 515' |
| 5 | 521 | 29B | 521' |
| 5 | 522 | 29B | 522' |
| 5 | 529 | 29B | 515' |
| 5 | 533 | 29B | 533' |
| 5 | 534 | 29B | 534' |
| 5 | 535 | 29B | 535' |
| 5 | 536 | 29B | 536' |
| 5 | 537 | 29E | 537' |
| 5 | 538 | 29A | 508' |
| 5 | 539 | 29A | 508' |

"Tech" Module/Interface

Figure 7A:
FIG. 7A is a screen print of the information shown when a user clicks on the "Tech" button 63.

An asset control system must provide for the inputting and monitoring of technical information associated with each asset. FIG. 7A is a screen print of the information shown when a user, typically a repair technician as opposed to a customer, clicks on the "Tech" button 63. In addition to indicating, at 79, the database into which the user is logged in, a series of hyperlinks 110-116 is provided.

Hyperlinks 110-115 provide access to data input screens (those associated with hyperlinks 110, 111, 114, and 115 are not shown in the Figures) typically utilized by repair technicians to enter information associated with a specific job or type of equipment. In particular, hyperlink 113 provides the technician with access to the screen shown in FIG. 7B in order to edit the information associated with a specific in-process job. The information that may be edited includes the "Job Start Date" in field 541, the "Job Status" via drop down menu 537 which then appears in field 542, the "Failure Description" via drop down menu 553 which then appears in field 544, the "Total Labor" in field 545, the "Repair (Parts) Total" in field 546, the "Job Completion Date" in field 547, the "Job Description" via drop down menu 556 which then appears in field 548, the "Repair Description" via drop down menu 549 which then appears in field 555, the "Repair Comments" in field 551, and the "Parts Used" in field 552.

Hyperlink 112 provides a technician with access to the data entry screen of FIG. 8. FIG. 8 shows an example of a unique third party requirement—a screen layout of an Image Intensifier Test Data Sheet prior to its completion by a repair technician. The data that is entered includes the "AIMS File Name" in field 561, the "AIMS MTF" in field 562, the "R1" in field 563, the "EBI" in field 564, the "Maximum Gain" in field 565, the "Minimum Gain" in field 566, the "Input Current" in field 567, the "Signal to Noise Ratio" in field 568, the "Center Resolution" in field 569, "Visual Quality" information in fields 570-587, the "Reason for Failure" in field 588, the "QA Result" in field 589, the "Labor Hours" in field 590, "Comments" in field 591, and the "Date" in field 592.

Hyperlink 116 provides a technician with access to previously entered data such as that shown in the screen print of FIG. 9. As one can see, image intensifiers have many data points that must be tracked to, for example, provide an engineering trend analysis. This module/interface accommodates the entry and reporting of such data. This module also may be used as a source of historical asset information by a technician, such that proper repair decisions may be made or that repeat failures are identified.

The following table shows the correlation between the data entered via the screens shown in FIGS. 7B and 8 and the data tables of FIGS. 29A-J:

| FIG. | Data Entry Point Reference Numeral | FIG. | Data Table/Field Reference Numeral |
|---|---|---|---|
| 7B | 537 | 29E | 537' |
| 7B | 541 | 29C | 541' |
| 7B | 542 | 29C | 542' |
| 7B | 544 | 29C | 544' |
| 7B | 545 | 29C | 545' |
| 7B | 546 | 29C | 546' |
| 7B | 547 | 29C | 547' |
| 7B | 548 | 29C | 542' |
| 7B | 549 | 29C | 549' |
| 7B | 551 | 29C | 551' |
| 7B | 552 | 29C | 552' |
| 7B | 553 | 29A | 553' |
| 7B | 555 | 29C | 555' |
| 7B | 556 | 29E | 556' |
| 8 | 561 | 29G | 561' |
| 8 | 562 | 29G | 562' |
| 8 | 563 | 29G | 563' |
| 8 | 564 | 29G | 564' |
| 8 | 565 | 29G | 565' |
| 8 | 566 | 29G | 566' |
| 8 | 567 | 29G | 567' |
| 8 | 568 | 29G | 568' |
| 8 | 569 | 29G | 569' |
| 8 | 570 | 29G | 570' |
| 8 | 571 | 29G | 571' |
| 8 | 572 | 29G | 572' |
| 8 | 573 | 29G | 573' |
| 8 | 574 | 29G | 574' |
| 8 | 575 | 29G | 575' |
| 8 | 576 | 29G | 576' |
| 8 | 577 | 29G | 577' |
| 8 | 578 | 29G | 578' |
| 8 | 579 | 29G | 579' |
| 8 | 580 | 29G | 580' |
| 8 | 581 | 29G | 581' |
| 8 | 582 | 29G | 582' |
| 8 | 583 | 29G | 583' |
| 8 | 584 | 29G | 584' |
| 8 | 585 | 29G | 585' |
| 8 | 586 | 29G | 586' |
| 8 | 587 | 29G | 587' |
| 8 | 588 | 29G | 588' |
| 8 | 589 | 29G | 589' |
| 8 | 590 | 29G | 590' |
| 8 | 591 | 29G | 591' |
| 8 | 592 | 29G | 592' |

"Reports" Module/Interface

To provide for the efficient interpretation of available data, it must be presented in an appropriate format. In general, the most appropriate format is one that is user-defined or user-selected from a plurality of configuration parameters. This module provides a series of user-definable report structures and graphs to display asset information for a variety of users and/or purposes (e.g. an overall look at workload issues).

Figure 10:
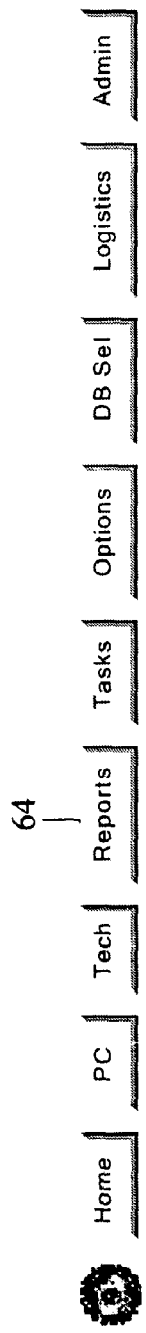
FIG. 10 is a screen print of the information shown when a user clicks on the "Reports" button 64.

FIG. 10 is a screen print of the information shown when a user clicks on the "Reports" button 64. In addition to indicating, at 79, the database into which the user is logged in, means for defining two key report parameters are provided by the drop down menu 130 and a series of buttons 131-135. The drop down menu 130 allows the user to select the time period from which the data will be drawn, while the buttons 131-135 provide for a choice among several report types/formats. The currently set time period is displayed at line 136 such that the user may determine if the use of the drop down menu 130 is required. The drop down menu 130 may be programmed to contain any user-desired period of time (e.g. specific weeks, months, years).

Figure 11:
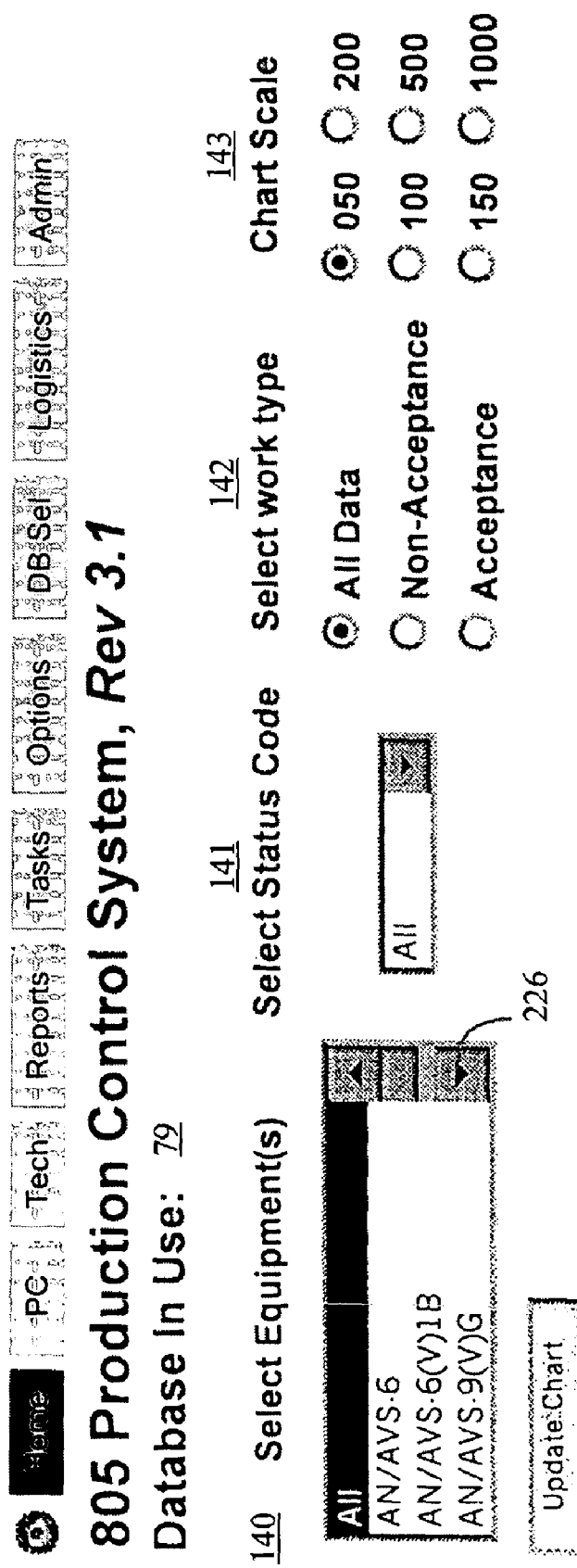
FIG. 11 is a screen print showing the report configuration parameters that are made available to a user to generate a report in chart form.
Figure 12:
FIG. 12 is a screen print showing the report configuration parameters that are made available to a user to generate a report in graph form.

FIGS. 11 and 12 are screen prints of information that may be accessed by clicking on the "Graphs" button 135 of FIG. 10. In FIG. 11, in addition to indicating, at 79, the database into which the user is logged in, means for defining several chart report parameters are provided by the drop down menus 140, 141 for "equipment" and "status code" designations, and the two groupings 142, 143 of "work type" and "chart scale" choices. In FIG. 12, in addition to indicating, at 79, the database into which the user is logged in, means for defining several graphic report parameters are provided by the drop down menu 145 for the "equipment" designations, and the three groupings 146, 147, 148 of "work type", "chart type", and "chart scale" choices. Additionally, in the lower, left hand section 149 of the screen, a table relating a number of "Job Status" conditions with the number of projects (i.e. "Work Volume") currently in that condition is provided.

Figure 13:
FIG. 13 shows an example of a "Jobs Open" report structure.

FIGS. 13-16B provide examples of text-style report structures that are available via this module/interface. FIG. 13 shows a "Jobs Open" report, as indicated on the "Status" line 150, providing a number of details regarding a piece of equipment designated as an "AVN-126-001" possessing serial no. 10456. The project information includes "PC Job Detail" 151, "Tech Job Detail" 152, "Shop Traveler" 153, "Equipment" 154, "Serial Number" 155, "Date Created" 156, Days in Shop" 157, "Job Status" 158, and "Last Transaction" 159. As with each of the previous Figures, the database into which the user is logged in is indicated at 79. The "Jobs Open" report typically provides a user with real-time data as to a specific task request number (see line 185) and any associated jobs (i.e. column 151).

FIG. 14 shows, as indicated at line 160, an "Items that are in G Condition" report. Line 161 shows the number of records found to match the report parameters. The "Job Number" 162, "ICN" 163, "Equipment" 164, "Serial Number" 165, "Repairer" 166, "Job Status" 167, "Date Transfer In" 168, and "Day(s) in Shop" 169 are listed for each record in the report's eight columns. The database into which the user is logged in is indicated at 79. The "Items that are in G Condition" report typically provides a user with real-time data as any jobs (i.e. column 162) that are on hold awaiting the arrival of one or more parts.

Figure 15A:
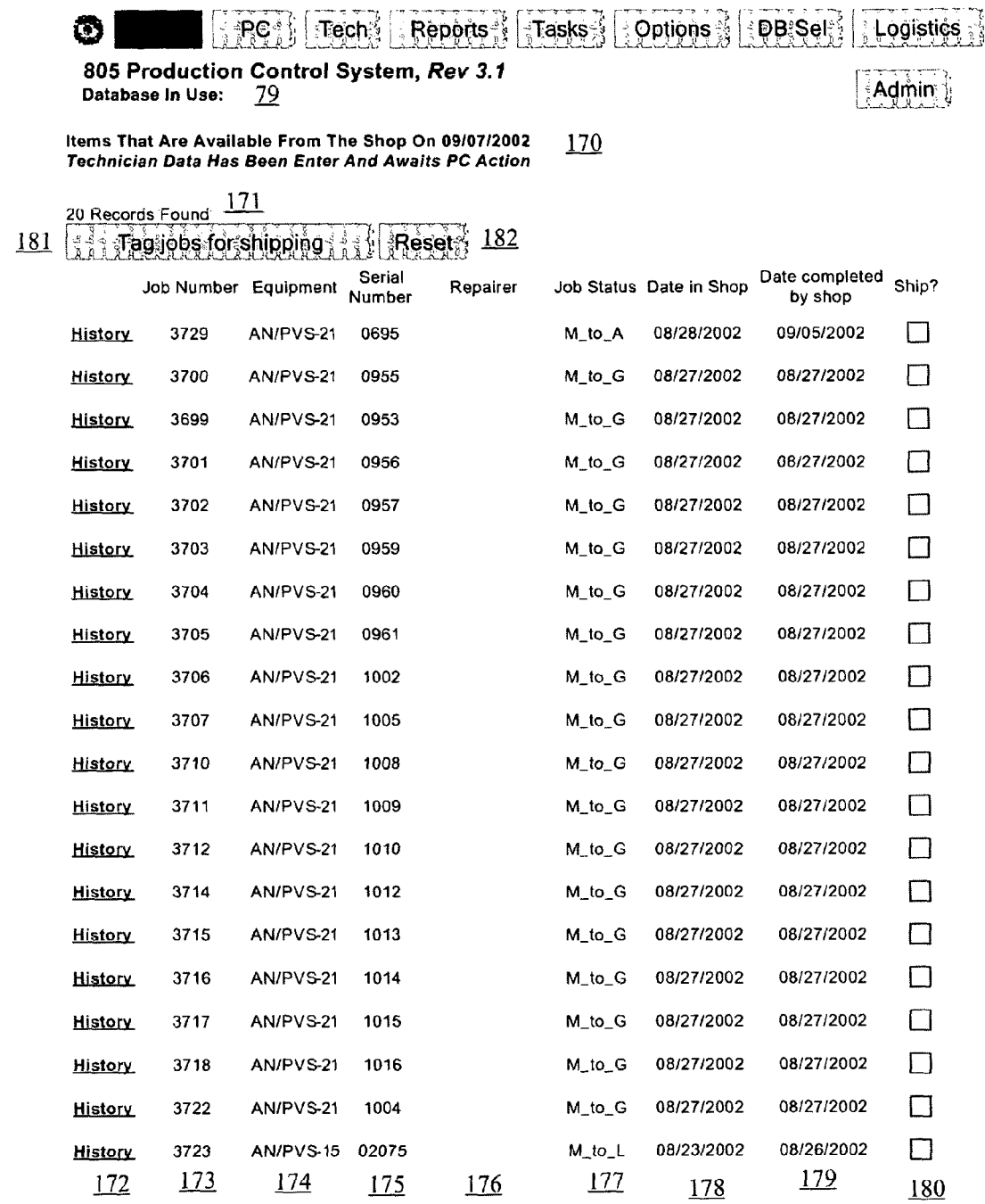
FIG. 15A shows an example of an "Equipment Ready for Shipment" report structure.
Figure 15B:
FIG. 15B is an example of the information accessed via a "History" hyperlink 172 of FIG. 15A.

FIG. 15A shows, as indicated at line 170, an "Items that are available from the shop on . . . " report. The database into which the user is logged in is indicated at 79. Line 171 shows the number of records found to match the report parameters. The "Job Number" 173, "Equipment" 174, "Serial Number" 175, "Repairer" 176, "Job Status" 177, "Date in Shop" 178, and "Date completed by shop" 179 are listed for each record in seven of the report's nine columns. Column 172 provides a hyperlink to the complete history (i.e. a journal of data entry edits) for the associated job number shown in column 173. FIG. 15B provides an example of the information accessed via a "History" hyperlink 172 including "Job Number" 183, "Log Date" 184, "Transaction Date" 186, "Job Status" 187, "Enter by" 188 (i.e. name of individual that entered the job data), and "Comments" 189.

Column 180 provides a user with the ability to indicate, by clicking on the appropriate box, which jobs are ready to be shipped (i.e. in the case of a repair, ready to be returned to the owner). After indicating, in column 180, the jobs that are ready for shipment, button 181 is clicked to "tag", within the database, those jobs for the manual steps required to physically ship the item(s). Clicking on button 182 resets, or clears, any of the boxes in column 180 that may have been clicked on earlier in the user's work session.

FIG. 16A shows, as indicated at line 190, a "Parts for _____, sorted by equipment" report. The database into which the user is logged in is indicated at 79. Line 191 shows the model designation for the top level assembly of the individual parts listed in the report. The "Part Number" 193, "Common Name" 194, "NSN" 195, "Cost" 196, "On Hand" 197, "Available to Tech" 198, "Location" 199, and "Ref No." 200 are listed for each record in eight of the report's nine columns. Column 192 provides a hyperlink allowing the user to edit (i.e. update parts information) the information associated with the part number shown in column 193. FIG. 16B provides an example of the information accessed via an "Edit" hyperlink 192 including "Equipment" 370, "Part Number" 371, "Part Name" 372, "Part NSN" 373, "Part Cost" 374, "Inventory Count" 375, "Inventory Trip Point" 376, "COG" 377, "Ref no" 378, "Display Part on Tech Screen?" 379, and "Location Code" 380. Lines 371-380 represent job data that may be edited via hyperlink 192. A part record can be deleted by clicking on button 381.

The following table shows the correlation between the data entered via the screen shown in FIG. 16B and the data tables of FIGS. 29A-J:

| FIG. | Data Entry Point Reference Numeral | FIG. | Data Table/Field Reference Numeral |
|---|---|---|---|
| 16B | 370 | 29B | 370' |
| 16B | 371 | 29B | 371' |
| 16B | 372 | 29B | 372' |
| 16B | 373 | 29B | 373' |
| 16B | 374 | 29B | 374' |
| 16B | 375 | 29B | 375' |
| 16B | 376 | 29B | 376' |
| 16B | 377 | 29B | 377' |
| 16B | 378 | 29B | 378' |
| 16B | 379 | 29B | 379' |
| 16B | 380 | 29B | 380' |

"Tasks" Module/Interface

An asset control system must provide for the creation and maintenance of "task" information (i.e. directions given to a repair shop/warehouse to perform some action) associated with each asset. FIG. 17 is a screen print of the information shown when a user clicks on the "Tasks" button 65. In addition to indicating, at 79, the database into which the user is logged in, a series of hyperlinks 210-216 is provided.

Hyperlinks 210 and 211 provide access to data input screens (that associated with hyperlink 211 is not shown in the Figures) typically utilized by a user (e.g. customer with appropriate access rights) to enter, or modify, information associated with a specific job. Hyperlinks 212 and 213 provide access to screens (that associated with hyperlink 213 is not shown in the Figures) typically utilized by a user to generate reports containing information as to the status of a specific job. Hyperlinks 214-216 provide access to data input or captured data display screens (those associated with hyperlinks 215 and 216 are not shown in the Figures) that typically allow a user to either issue material (e.g. a specific NSN) from a supply center/warehouse to another user, or to display the results of the process. This process is also known as a "data push". The present invention possesses the flexibility to collect this data and to "push" the data to external, third party users.

Hyperlink 210 provides a user with access to a blank Task Request Page shown in FIGS. 18A-C. FIG. 19 provides a screen print example of a completed Task Request Page. As with many of the screen prints discussed above, the database into which the user is logged in is indicated at 79 on FIG. 18A.

At Step 1 in FIG. 18A, information about the user (i.e. "requester") is entered. The information that is entered includes a user name at 220, a user code via drop down menu 621 which then appears in field 221, and the date on which the request in generated at 222. The data entered at Step 1 appears in the completed Task Request Page of FIG. 19 at lines 251-253.

At Step 2 in FIG. 18A, information regarding the nature of the task is entered. The information that is entered includes an indication as to whether the task request is "Urgent" in nature at 223, the nature of the desired task via drop down menu 506 which then appears in field 224, and a user-specified description of the requested task at 225. The data entered at Step 2 appears in the completed Task Request Page of FIG. 19 at lines 254-256.

At Step 3 in FIG. 18B, information about the specific equipment is entered. The information that is entered includes either an equipment model designation via drop down menu 226 or an equipment NSN via drop down menu 227 which then appears in field 228, a condition code for the item via drop down menu 628 or 629 which then appears in field 229, a purpose code for the item via drop down menu 504 or 630 which then appears in field 230, the quantity of items to be processed at 231, and a user-specified description of the desired deliverables at 232. The data entered at Step 3 appears in the completed Task Request Page of FIG. 19 at lines 257-261. The information contained in drop down menu 226 is linked via JavaScript to that contained in drop down menu 227 such that a user needs to make a selection from only one of the two menus (i.e. the non-selected menu then immediately correlates the information it displays to that chosen in the selected menu). This feature provides users knowing only the "Equipment" designation/model number or only the "NSN" with equivalent means for accessing database information.

At Step 4 in FIG. 18C, information regarding the means of payment for the services to be rendered is entered. The information that is entered includes a WBS or charge number for the Production Controller Labor at 233 or 234, respectively, a WBS or charge number for the Technician Labor at 235 or 236, respectively, a WBS or charge number for the Material at 237 or 238, respectively, and a WBS or charge number for the Supply Support at 239 or 240, respectively. The data entered at Step 4 appears in the completed Task Request Page of FIG. 19 at lines 262-265.

At Step 5 in FIG. 18C, information associated with new assets is entered. The information that is entered includes a contract number at 241, a requisition number at 242, a contract CLIN number at 243, the quantity being ordered at 244, a project/group for which the item is being ordered at 245, and a supplier company name at 246. The data entered at Step 5 appears in the completed Task Request Page of FIG. 19 at lines 266-270.

At Step 6 in FIG. 18C, e-mail information is entered. The information that is entered includes the name of the individual to which an e-mail message is to be forwarded at 247 and the name of the person sending the e-mail message at 248.

Line 250 on FIG. 19 displays the name of the customer database associated with the task request and line 271 repeats that name and includes the task number assigned to that request.

Hyperlink 212 on FIG. 17 provides the user with access to the screen shown in FIG. 20 that allows a synopsis of the information associated with a specific task request to be reviewed. The scroll buttons 281, 282 allow the user to move sequentially through the task request numbers. Scroll button 280 allows the user to jump to the first task request number while button 283 allows the user to jump to the last task request number. The "Select" button 284 allows the user to gain access to the complete record of information associated with the selected task request number.

Hyperlink 214 on FIG. 17 provides the user with access to the screen shown in FIG. 21 that allows a "Request for Issue" to be generated. This screen allows data to be inserted into a legacy military system. Once again, the database into which the user is logged in is indicated at 79. The information that is entered includes either an NSN via drop down menu 227 which then appears in field 290 or an equipment name/description via drop down menu 226 which then appears in field 291, a user-specified quantity at 292, an activity code/description via drop down menu 693 which then appears in field 293, a UIC via drop down menu 508 which then appears in field 294, a user-specified date Julian at 295, user-specified request for issue number at 296, a user-specified date requested at 297, and user-specified remarks at 298. If the request is for "Local Issue", a charge number is entered at 299 and a building location is specified at 300. To process the information entered in the form, the user clicks on the "Insert Data" button 301.

The following table shows the correlation between the data entered via the screens shown in FIGS. 18A-C and 21 and the data tables of FIGS. 29A-J:

| FIG. | Data Entry Point Reference Numeral | FIG. | Data Table/Field Reference Numeral |
|---|---|---|---|
| 18A | 220 | 29E | 220' |
| 18A | 221 | 29E | 221' |
| 18A | 222 | 29E | 222' |
| 18A | 223 | 29E | 223' |
| 18A | 224 | 29E | 224' |
| 18A | 225 | 29E | 225' |
| 18B, 21 | 226 | 29A | 226' |
| 18B, 21 | 227 | 29A | 227' |
| 18B | 228 | 29E | 228' |
| 18B | 229 | 29E | 229' |
| 18B | 230 | 29E | 230' |
| 18B | 231 | 29E | 231' |
| 18B | 232 | 29E | 232' |
| 18C | 233 | 29E | 233' |
| 18C | 234 | 29E | 234' |
| 18C | 235 | 29E | 235' |
| 18C | 236 | 29E | 236' |
| 18C | 237 | 29E | 237' |
| 18C | 238 | 29E | 238' |
| 18C | 239 | 29F | 239' |
| 18C | 240 | 29F | 240' |
| 18C | 241 | 29E | 241' |
| 18C | 242 | 29E | 242' |
| 18C | 243 | 29E | 243' |
| 18C | 244 | 29E | 244' |
| 18C | 245 | 29E | 245' |
| 18C | 246 | 29E | 246' |
| 18C | 248 | 29D | 248' |
| 21 | 290 | 29F | 290' |
| 21 | 291 | 29F | 291' |
| 21 | 292 | 29F | 292' |
| 21 | 293 | 29F | 293' |
| 21 | 294 | 29F | 294' |
| 21 | 295 | 29F | 295' |
| 21 | 296 | 29F | 296' |
| 21 | 297 | 29F | 297' |
| 21 | 298 | 29F | 298' |
| 21 | 299 | 29F | 299' |
| 21 | 300 | 29F | 300' |
| 18B | 504 | 29E | 504' |
| 18A | 506 | 29E | 506' |
| 21 | 508 | 29A | 508' |
| 18B | 628 | 29D | 628' |
| 18B | 629 | 29D | 629' |
| 18B | 630 | 29E | 630' |
| 21 | 693 | 29A | 693' |

"Options" Module/Interface

An asset control system must provide for the creation and maintenance of information (e.g. drop down menu selections) associated with each database. FIG. 22 is a screen print of the information shown when a user clicks on the "Options" button 66. In addition to indicating, at 79, the database into which the user is logged in, a series of hyperlinks 310-320 is provided.

Hyperlinks 310-314 provide access to data input screens (those associated with hyperlinks 310-312 and 314 are not shown in the Figures) typically utilized by a user (e.g. customer with appropriate access rights) to enter, delete, or modify, information associated with a specific database. Hyperlinks 315-320 provide access to screens (not shown in the Figures) typically utilized by a user to enter, delete, or modify, information associated with all of the databases associated with the present invention.

FIG. 23 shows, as indicated at line 324, the "Repair codes descriptions for drop down list boxes". The database into which the user is logged in is indicated at 79. The "Repair Code" 327 and associated "Description" 328 are shown in two of the screen's four columns. Column 326 provides a hyperlink allowing the user to edit the information on the associated line while the "Delete" hyperlink found in column 329 provides for the complete removal of the associated line. The "Add" hyperlink 325 provides a user with the ability to create a new repair code/description association—an example of total user control (i.e. data display configurability) to create and track appropriate trend data input unique to that user's needs, inherent in the present invention.

"DB Sel" Module/Interface

Figure 24:
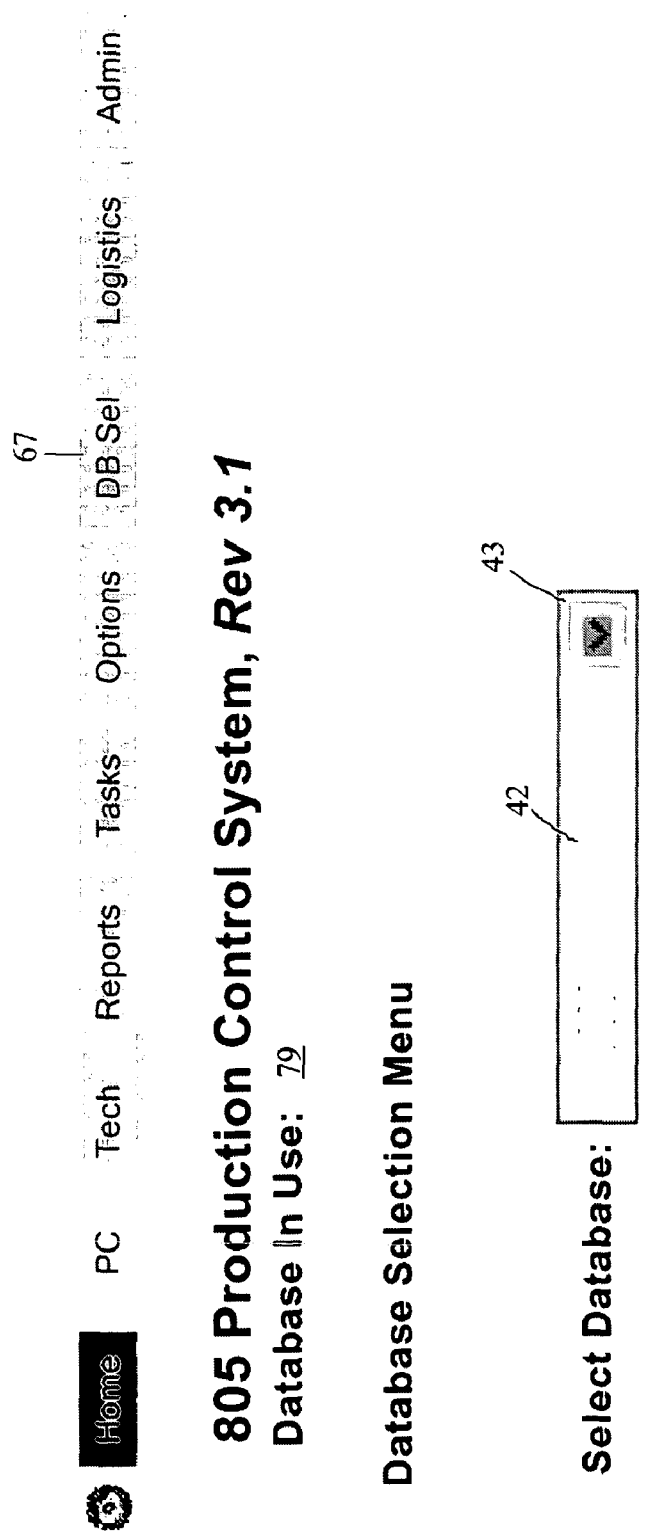
FIG. 24 is a screen print of the information shown when a user clicks on the "DB Sel" button 67.

An asset control system must provide a user possessing multiple database rights with the ability to switch back and forth among them. FIG. 24 is a screen print of the information shown when a user clicks on the "DB Sel" button 67 (note that FIG. 24 is nearly identical to FIG. 1C). In addition to indicating, at 79, the database into which the user is currently logged in, the user is provided with the means to access a different database by selecting of one of the choices shown on the drop down menu at 43, which then appears in field 42, prior to clicking on the "Choose" button 331.

The following table shows the correlation between the data entered via the screen shown in FIG. 24 and the data tables of FIGS. 29A-J:

| FIG. | Data Entry Point Reference Numeral | FIG. | Data Table/Field Reference Numeral |
| --- | --- | --- | --- |
| 24 | 42 | 29D | 42' |
| 24 | 43 | 29D | 43' |

"Logistics" Module/Interface

Many third parties (e.g. government entities) require asset tracking that ensures the optimum utilization of all applicable warranties. This module/interface provides instant access to current warranty data to ensure that that important goal is accomplished. This module/interface also allows for the entry of warranty data and provides a real-time display of warranty status via various report structures. The present invention is integrated with the production/repair process to provide notification to a production controller, as an asset is received, that a warranty can be utilized.

An asset control system must also provide a means for tracking and returning warranty rejects back to the respective supplier/manufacturer. This module/interface allows for the inputting and tracking of information regarding rejected items as they are returned to, or received from, a third party.

FIG. 25 is a screen print of the information shown when a user clicks on the "Logistics" button 68. In addition to indicating, at 79, the database into which the user is logged in, a series of hyperlinks 340-347 is provided.

Hyperlinks 340 and 341 provide access to data input screens (that associated with hyperlink 341 is not shown in the Figures) typically utilized by a user (e.g. customer with appropriate access rights) to enter, or modify, information associated with a specific warranty. Hyperlinks 342-345 provide access to screens (those associated with hyperlinks 343-345 are not shown in the Figures) typically utilized by a user to generate reports containing warranty information. Hyperlinks 346 and 347 provide access to data input screens (not shown in the Figures) typically utilized by a user to enter, or modify, information associated with a specific QDR.

Hyperlink 340 on FIG. 25 provides the user with access to the screen shown in FIG. 26 that allows a new warranty record to be generated. Once again, the database into which the user is logged in is indicated at 79. The information that is entered includes an equipment name/description via drop down menu 226 which then appears in field 350 or an NSN via drop down menu 227 which then appears in field 351, user-specified serial number information either in field 352 or field 353, a warranty end date at 354, a user-specified contract number at 355, a user-specified contract CLIN at 356, a user-specified requisition number at 357, a user-specified delivery order number at 358, user-specified DD250 information at 359, and a user-specified DD250 date at 360. To process the information entered in the form, the user clicks on the "Add Items" button 361. The information contained in drop down menu 350 is linked via JavaScript to that contained in drop down menu 351 such that a user needs to make a selection from only one of the two menus (i.e. the non-selected menu then immediately correlates the information it displays to that chosen in the selected menu). This feature provides users knowing only the "Equipment" designation/model number or only the "NSN" with equivalent means for accessing database information.

Figure 27:
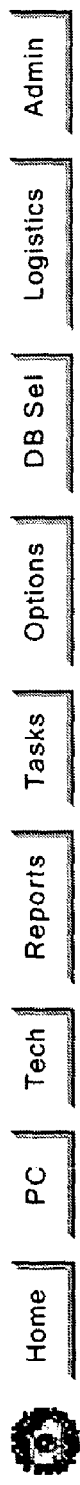
FIG. 27 is a screen print showing the report configuration parameters that are made available to a user to generate a warranty report.

FIG. 27 is a screen print of information that may be accessed by clicking hyperlink 342 on FIG. 25. In addition to indicating, at 79, the database into which the user is logged in, means for defining a number of report parameters include an equipment name/description via drop down menu 226 which then appears in field 350 or an NSN via drop down menu 227 which then appears in field 351, and a user-specified serial number at 367. To process the report request per the parameters entered at 365-367, the user clicks on the "Search" button 368.

The following table shows the correlation between the data entered via the screens shown in FIGS. 26 and 27 and the data tables of FIGS. 29A-J:

| FIG. | Data Entry Point Reference Numeral | FIG. | Data Table/Field Reference Numeral |
| --- | --- | --- | --- |
| 26, 27 | 226 | 29A | 226' |
| 26, 27 | 227 | 29A | 227' |
| 26 | 350 | 29I | 350' |
| 26 | 351 | 29I | 350' |
| 26 | 352 | 29I | 353' |
| 26 | 353 | 29I | 353' |
| 26 | 354 | 29I | 354' |
| 26 | 355 | 29I | 355' |
| 26 | 356 | 29I | 356' |
| 26 | 357 | 29I | 357' |
| 26 | 358 | 29I | 358' |
| 26 | 359 | 29I | 359' |
| 26 | 360 | 29I | 360' |
| 27 | 365 | 29I | 365' |
| 27 | 366 | 29I | 365' |
| 27 | 367 | 29I | 367' |

"Admin" Module/Interface

Figure 28:
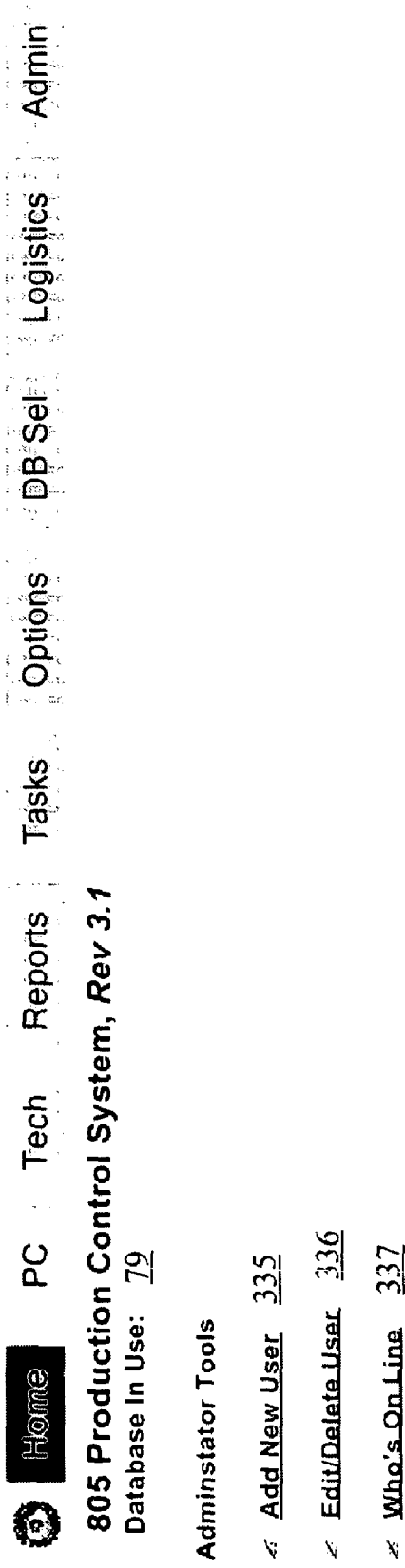
FIG. 28 is a screen print of the information shown when a user clicks on the "Admin" button 69.

An asset control system must provide for its own administration. FIG. 28 is a screen print of the information shown when a user clicks on the "Admin" button 69. In addition to indicating, at 79, the database into which the user is logged in, a series of hyperlinks 335-337 is provided. The hyperlinks 335-337, respectively, allow an administrator to add a new user, to delete or edit an existing user, and to determine which users are on-line (i.e. interacting with the present invention) at any given time.

Hardware Architecture

The system includes a conventional computer workstation, operating system, and the software-implemented process of the present invention. The computer workstation may be, for example, a conventional personal computer with standard internal components (e.g. a microprocessor with peripheral chipset mounted on an appropriate motherboard). Of course, other more or less powerful computer systems can be used, but it is suggested that the computer system meet the minimum system requirements for Microsoft Access 97, or an equivalent database operating system. The user interface is preferably a conventional color monitor, a modem, and a standard input device such as a mouse. The operating system is preferably Windows 95, or a later revision. All data entry forms may be maintained on the Internet for user access, and a separate web server is required in this case.

The system software may be compressed onto a series of installation floppy diskettes, and may be loaded onto a computer system as described above using conventional installation macros such as provided with Windows 2000.

Bar Code Readers

SPT1700 "palm style" bar code readers are used to allow the gathering of inventory data and allow technicians to enter their repair data as it happens and then upload it at a later time.

FIGS. 29A through 29J show the data tables and associated field definitions for a preferred embodiment of the present invention. The named data tables include "ACTIVITY" (see FIG. 29A), "Equip" (see FIG. 29A), "Equip_Task" (see FIG. 29A), "Equip_Type" (see FIG. 29A), "Failure_Code" (see FIG. 29A), "History" (see FIG. 29A), "PCS" (see FIG. 29B), "PCS_Parts" (see FIG. 29B), "PCS_Repair" (see FIG. 29C), "PCS_Repair_Sub" (see FIG. 29C), "Repair_Code" (see FIG. 29C), "Condition_Code" (see FIG. 29D), "Data_users" (see FIG. 29D), "PCS_Database_List" (see FIG. 29D), "PCS_Name_List" (see FIG. 29D), "PCS_Name_List_temp" (see FIG. 29D), "Permission" (see FIG. 29D), "Purpose_Code" (see FIG. 29E), "Request_Task" (see FIG. 29E), "Status" (see FIG. 29E), "WOR" (see FIGS. 29E and 29F), "805_RFI_Num" (see FIG. 29F), "Activity" (see FIG. 29F), "RFI_Assignments" (see FIG. 29F), "Tube_data" (see FIG. 29G), "Tube_spec" (see FIG. 29H), "QDR" (see FIG. 29I), "Warranty" (see FIG. 29I), "ECP" (see FIG. 29J), and "Help" (see FIG. 29J).

The various data tables include a number of relational database linkages. These include fields named "ID" (see reference numerals 401, 402, 404, and 405 in FIG. 29A; 415 in FIG. 29C; 416 and 417 in FIG. 29D; 422-427 in FIGS. 29E and 29F; and 431 in FIG. 29H), "IDkey" (see reference numerals 403 and 407 in FIG. 29A; 409 and 410 in FIG. 29B; 411 and 413 in FIG. 29C; 418-420 in FIG. 29D; and 435 in FIG. 29J), "Jobnum" (see reference numeral 406 in FIG. 29A; 412 and 414 in FIG. 29C; and 430 in FIG. 29G), "WORnum" (see reference numeral 408 in FIG. 29B), "Permission_ID" (see reference numeral 421 in FIG. 29D), "IDRFIAssignment" (see reference numeral 428 in FIG. 29F), "Tube_ID" (see reference numeral 429 in FIG. 29G), "QDR_ID" (see reference numeral 432 in FIG. 29I), "Warranty_ID" (see reference numeral 433 in FIG. 29I), and "ECPID" (see reference numeral 434 in FIG. 29J).

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A distributed access asset control system comprising:

A storage medium;

a first plurality of processing sequences and graphical user interfaces associated with a first customer group adapted to enable user interaction, access, data collection and data, retrieval, and display, said first plurality of processing sequences and graphical user interfaces comprising:

an access control section adapted to selectively authorize access to portions of said distributed asset control system;

a production control section, wherein said production control section is adapted to associate tasks with at least one federal appropriation related accounting code and an available federal appropriation amount;

a repair or acceptance technician section;

a system administration section;

a repair action section;

a asset warranty management section;

a report section;

an approved and funded task scheduler section, said scheduler section enables association of tasks with an asset owner, asset possessors or asset managers who fund tasks associated with one or more assets;

an acceptance action section;

a second plurality of processing sequences and graphical user interfaces associated with a second customer group comprising one or more processing sequences and graphical user interfaces associated with said first plurality of processing sequences including processing sequences and graphical user interfaces which has modifications associated with a customer within said second customer group, wherein said second plurality of processing sequences and graphical user interfaces is selected based on a plurality of customer related data including user login identification;

an interface section adapted to interface with at least one another asset control system adapted to identify data interface parameters associated with said at least one another asset control system, determine data associated with an asset related request to said at least one another asset control system and a section for sending said data associated with an asset related request to said at least one another asset control system; and a plurality of data structures adapted to store data including:

a plurality of asset data, a plurality of entity data associated with said plurality of asset data including said asset owner, asset possessors or asset managers;

a plurality of task data including new, in-process, and completed tasks data;

a plurality of asset repair processes data;

a plurality of asset storage data;

a plurality of at least one federal appropriation related accounting code data;

a plurality of available federal appropriation amount data;

a plurality of repair cost data;

a plurality of first part identifier data;

a plurality of repair code data;

a plurality of failure code data adapted to be associated with repair or acceptance actions;

a plurality of labor cost data associated with repair or acceptance actions including hourly rate data and technician identifier data;

a plurality of repair and acceptance criteria data associated with specific repair and acceptance actions;

a plurality of quality assurance results data;

a plurality of second part identifier data; and a plurality of asset warranty data.

2. A system as in claim 1, further comprising a report section adapted to produce reports including at least one current event reports, at least one task reports, at least one production management control reports, wherein said production management control reports are based on data comprising equipment identification data, status data, inventory count data, part cost data, work type data, history data, repair code data, part number data, trend analysis data associated with said asset owner data, asset possessor data or asset manager data.

3. A distributed access asset control system comprising:

A storage medium;

a first plurality of processing sequences and graphical user interfaces associated with a first customer group adapted to enable user interaction, access, data collection and data, retrieval, and display, said first plurality of processing sequences and graphical user interfaces comprising:

an access control section adapted to selectively authorize access to portions of said distributed asset control system;

a production control section, wherein said production control section is adapted to associate tasks with at least one federal appropriation related accounting code and an available federal appropriation amount;

a repair or acceptance technician section;

a system administration section;

a repair action section;

a asset warranty management section;

a report section;

an approved and funded task scheduler section, said scheduler section enables association of tasks with an asset owner, asset possessors or asset managers who fund tasks associated with one or more assets;

an acceptance action section;

a second plurality of processing sequences and graphical user interfaces associated with a second customer group comprising one or more processing sequences and graphical user interfaces associated with said first plurality of processing sequences including processing sequences and graphical user interfaces which has modifications associated with a customer within said second customer group, wherein said second plurality of processing sequences and graphical user interfaces is selected based on a plurality of customer related data including user login identification;

an interface section adapted to interface with at least one another asset control system adapted to identify data interface parameters associated with said at least one another asset control system, determine data associated with an asset related request to said at least one another asset control system and a section for sending said data associated with an asset related request to said at least one another asset control system; and a plurality of data structures adapted to store data including:

a plurality of asset data, a plurality of entity data associated with said plurality of asset data including said asset owner, asset possessors or asset managers;

a plurality of task data including new, in-process, and completed tasks data;

a plurality of asset repair processes data;

a plurality of asset storage data;

a plurality of at least one federal appropriation related accounting code data;

a plurality of available federal appropriation amount data;

a plurality of repair cost data;

a plurality of first part identifier data;

a plurality of repair code data;

a plurality of failure code data adapted to be associated with repair or acceptance actions;

a plurality of labor cost data associated with repair or acceptance actions including hourly rate data and technician identifier data;

a plurality of repair or acceptance criteria data associated with specific repair and acceptance actions;

a plurality of quality assurance results data;

a plurality of second part identifier data; and a plurality of asset warranty data.

4. A system as in claim 3, further comprising a report section adapted to produce reports including at least one current event reports, at least one task reports, at least one production management control reports, wherein said production management control reports are based on data comprising equipment identification data, status data, inventory count data, part cost data, work type data, history data, repair code data, part number data, trend analysis data associated with said asset owner data, asset possessor data or asset manager data.

* * * * *